US012625154B2

(12) United States Patent
Oda et al.

(10) Patent No.: US 12,625,154 B2
(45) Date of Patent: May 12, 2026

(54) SAMPLE MEASURING METHOD, CARTRIDGE, AND SAMPLE MEASURING DEVICE

(71) Applicant: SYSMEX CORPORATION, Kobe (JP)

(72) Inventors: Kohei Oda, Kobe (JP); Hironori Katsumi, Kobe (JP); Yoshinori Nakamura, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 327 days.

(21) Appl. No.: 18/145,953

(22) Filed: Dec. 23, 2022

(65) Prior Publication Data

US 2023/0204615 A1 Jun. 29, 2023

(30) Foreign Application Priority Data

Dec. 28, 2021 (JP) ................................. 2021-213753

(51) Int. Cl.
*G01N 35/10* (2006.01)
*G01N 35/04* (2006.01)
G01N 35/00 (2006.01)

(52) U.S. Cl.
CPC ............. *G01N 35/10* (2013.01); *G01N 35/04* (2013.01); *G01N 2035/00534* (2013.01); *G01N 2035/0406* (2013.01); *G01N 2035/0432* (2013.01)

(58) Field of Classification Search
CPC ................... G01N 35/10; G01N 35/04; G01N 2035/00534; G01N 2035/0406; G01N 2035/0432
See application file for complete search history.

(56) References Cited

U.S. PATENT DOCUMENTS 4,937,048 A * 6/1990 Sakai ............... G01N 33/54313
422/65
2005/0175502 A1 8/2005 Rousseau et al.
(Continued)

FOREIGN PATENT DOCUMENTS

JP 2005516218 A 6/2005
JP 2009-008503 A 1/2009
(Continued)

OTHER PUBLICATIONS

Extended European Search Report issued Jun. 16, 2023, by the European Patent Office in corresponding European Patent Application No. 22216398.2. (13 pages).
(Continued)

*Primary Examiner* — Jamel E Williams
(74) *Attorney, Agent, or Firm* — BUCHANAN INGERSOLL & ROONEY PC

(57) ABSTRACT

A sample measuring device reduces the frequency with which a user introduces a measurement aid into the sample measuring device is provided. A sample measuring method measures a sample using a container containing a measurement aid which is a solid. The sample measuring method includes loading a predetermined number of measurement aids into a container from a storage chamber in which a plurality of measurement aids are movably stored in a cartridge attached to a sample measuring device, dispensing the sample into the container, and measuring the sample in the container into which the measurement aid has been loaded.

20 Claims, 21 Drawing Sheets

(56)                  References Cited

U.S. PATENT DOCUMENTS

2006/0063271 A1     3/2006  Putnam et al.
2020/0038873 A1*    2/2020  Brossard ................ B65D 83/04
2021/0190779 A1*    6/2021  Bunce ................ G01N 33/5304

FOREIGN PATENT DOCUMENTS

JP        2012154755  A     8/2012
JP        2015-016468 A     1/2015
JP        2017015501  A     1/2017
JP           6525520  B2    6/2019
JP        2020517927  A     6/2020
WO      WO-0049382   A2 *   8/2000   .......... B01J 19/0046
WO        2014029753  A1    2/2014

OTHER PUBLICATIONS

Office Action (Notice of Reasons for Refusal) issued on Sep. 2, 2025, by the Japanese Patent Office in corresponding Japanese Patent Application No. 2021-213753, and an English Translation of the Office Action. (12 pages).

* cited by examiner

1

SAMPLE MEASURING METHOD, CARTRIDGE, AND SAMPLE MEASURING DEVICE

CROSS REFERENCE TO RELATED APPLICATIONS

This application claims priority from prior Japanese Patent Application(s) No. 2021-213753, filed on Dec. 28, 2021, entitled "SAMPLE MEASURING METHOD, CARTRIDGE, AND SAMPLE MEASURING DEVICE", the entire contents of which are incorporated herein by reference.

FIELD OF THE INVENTION

The present invention relates to a sample measuring method, a cartridge, and a sample measuring device.

BACKGROUND

There are known methods for measuring a sample using a container containing a measurement aid which is a solid. For example, in a platelet aggregation test, a container containing a stirrer as a measurement aid is used to measure while stirring a sample.

Japanese Patent Application Publication No. 2015-16468 discloses an apparatus for automatically loading a stirrer into a reaction vessel. The apparatus has a function of separating a plurality of stirrers introduced from the introducing aperture and filling the reaction vessel.

SUMMARY OF THE INVENTION

In Japanese Patent Application Publication No. 2015-16468, it is necessary for an user to introduce a plurality of stirrers into the introducing aperture. In conjunction with the increase in the frequency of measuring samples using a reaction container with a stirrer introduced, there is a need to reduce the frequency with which the user introduces a stirrer into the device.

In view of this issue, the present invention provides a sample measuring method, a cartridge, and a sample measuring device that enable a user to reduce the frequency of introducing measurement aids such as stirrers and metal balls into the device.

As shown in FIGS. 11 and 17, the sample measuring method of the present invention is a sample measuring method for measuring a sample using a container (B) containing a measurement aid (F) which is a solid, the method including loading (T1) a predetermined number of measurement aids (F) into the container (B) from a storage chamber (100) in which a plurality of measurement aids are stored so as to be respectively movable, the storage chamber being disposed in a cartridge attached to a sample measuring device; dispensing (T2) the sample into the container (B); and measuring (T5) the sample in the container (B) into which the measurement aid (F) has been loaded.

According to the sample measuring method of the present invention, since the measurement aid (F) is loaded in the container (B) from the storage chamber (100) of the cartridge (50) mounted to the sample measuring device, the frequency of the user loading measurement aids (F) into the device can be reduced.

As shown in FIGS. 3, 4, 6, 7, 11, 19 and 20, the cartridge (50) of the present invention is a cartridge to be attached to and detached from a sample measuring device for measuring a sample using a container (B) containing a measurement aid (F) which is a solid, the cartridge including a plurality of measuring aids (F) which are respectively a solid; a storage chamber (100) in which the plurality of measurement aids (F) are stored; a discharge chamber (101) communicating with the storage chamber (100) and having a discharge outlet (150) for discharging the measurement aid (F) in the storage chamber (100); and an attaching/detaching part (102) for attaching/detaching to/from the sample measuring device.

According to the cartridge (50) of the present invention, since the cartridge (50) containing a plurality of measurement aids (F) is attached to the sample measuring device and the measurement aids (F) are discharged from the cartridge (50), the frequency with which the user loads the measurement aid (F) into the device can be reduced.

As shown in FIGS. 2, 3, 8, 11 and 16, the sample measuring device of the present invention is a sample measuring device for measuring a sample using a container (B) containing a measurement aid (F) which is a solid, the sample measuring device including a mounting unit (200) to which a cartridge (50) storing a plurality of measurement aids (F) is detachably mounted; a removing unit (201) for removing the measuring aid (F) from the cartridge (50) mounted on the attaching/detaching part (102); a transfer unit (202) for transferring the measurement aid (F) removed from the cartridge (50) to the container (B); a dispensing unit (700) for dispensing the sample into the container (B); and a measuring unit (405) for measuring the sample in the container (B) to which the measurement aid (F) has been transferred.

According to the sample measuring device of the present invention, since the cartridge (50) containing a plurality of measurement aids (F) is attached to the sample measuring device and the measurement aids (F) are removed from the cartridge (50) and transferred to the container (B), the frequency with which the user loads the measuring aid (F) into the device can be reduced.

According to the present invention, it is possible to reduce the frequency with which the user loads the measurement aid into the sample measuring apparatus.

DESCRIPTION OF THE EMBODIMENTS OF THE INVENTION

Examples of embodiments of a sample measuring device, a cartridge, and a sample measuring method according to the present invention will be described in detail below with reference to the drawings.

Figure 1:
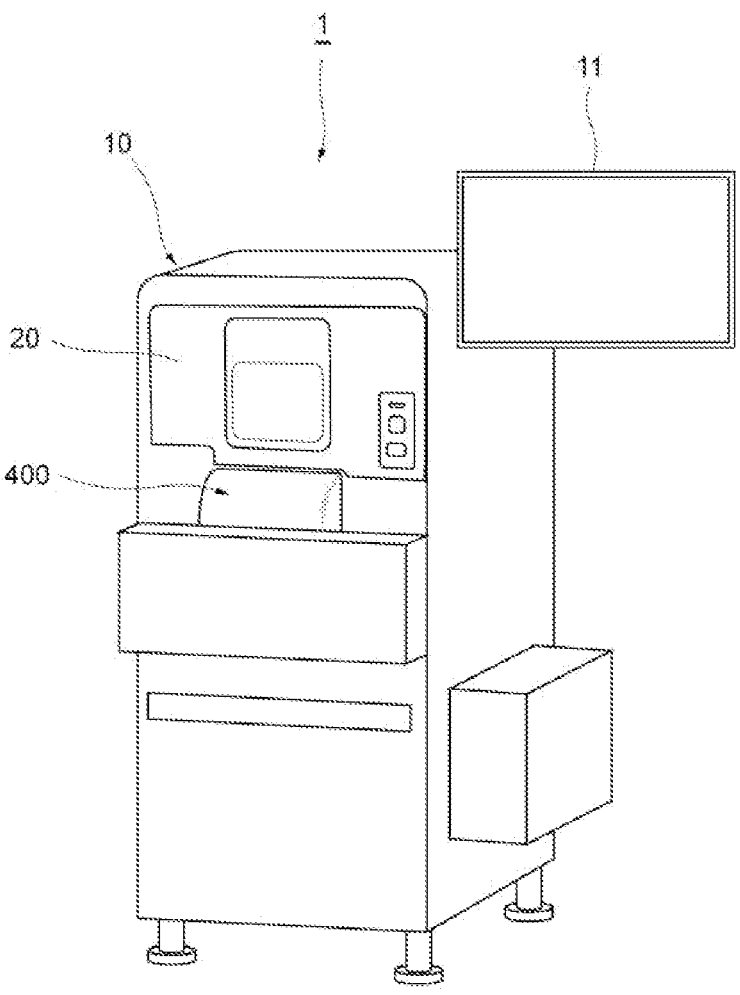
FIG. 1 is a perspective view showing an example of the external appearance of a sample measuring device.

FIG. 1 is a perspective view showing an example of the external appearance of a sample measuring device 1 according to an embodiment.

The sample measuring device 1 automatically measures a blood sample. The measurements includes measurement of platelet aggregation ability. The sample measuring device 1 can be loaded with a later-described cartridge 50 containing stirrers as measurement aid which is solids, and has a function of automatically inserting the stirrer from the cartridge into a cuvette used as a sample container. As shown in FIG. 1, the sample measuring device 1 includes a housing 10 having a substantially rectangular parallelepiped outer shape and a display 11 attached to the housing 10.

Figure 2:
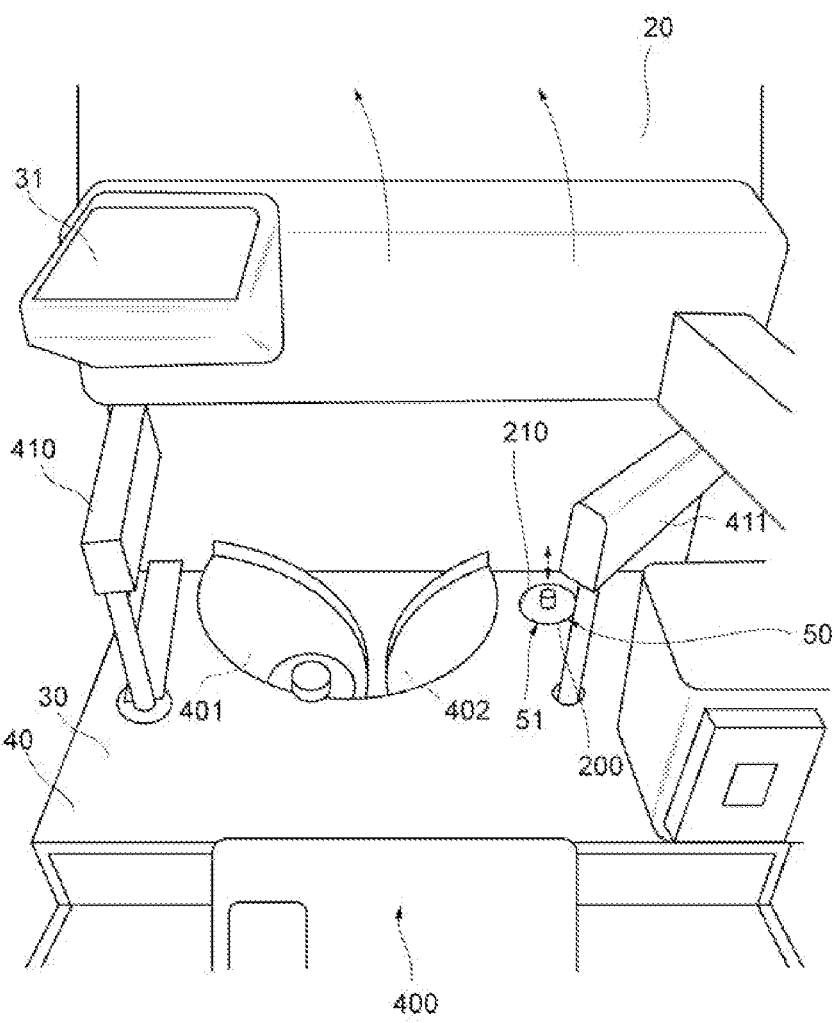
FIG. 2 is a diagram showing the sample measuring device with the front cover opened.

The housing 10 has a front cover 20 that can be opened and closed for work and operation by the user. The front cover 20 can be vertically slid or rotated to open the inside of the housing 10. FIG. 2 is a diagram showing the inside of the sample measuring device 1 with the front cover 20 opened. As shown in FIG. 2, a work table 30, a cuvette resupply unit 31, sample dispensing arms 410 and 411, which will be described later, and the like are provided inside the front cover 20 of the sample measuring device 1. The work table 30 has, for example, a substantially flat surface cover 40. The mounting unit 200 of the mounting mechanism 51 of the cartridge 50 is exposed to the surface cover 40. By opening the front cover 20, the user can work and operate the mounting unit 200 of the cartridge 50, the first table 401, the second table 402, the cuvette supply unit 31, and the like.

Cartridge

Figure 3:
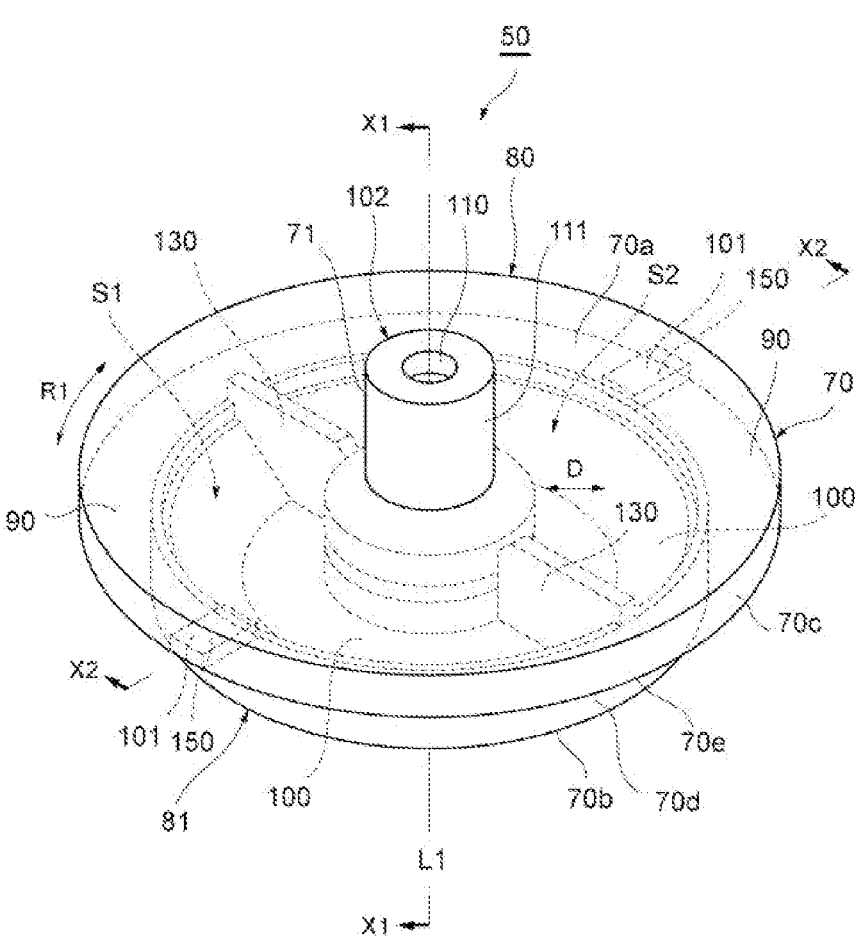
FIG. 3 is a perspective view of a cartridge.
Figure 4:
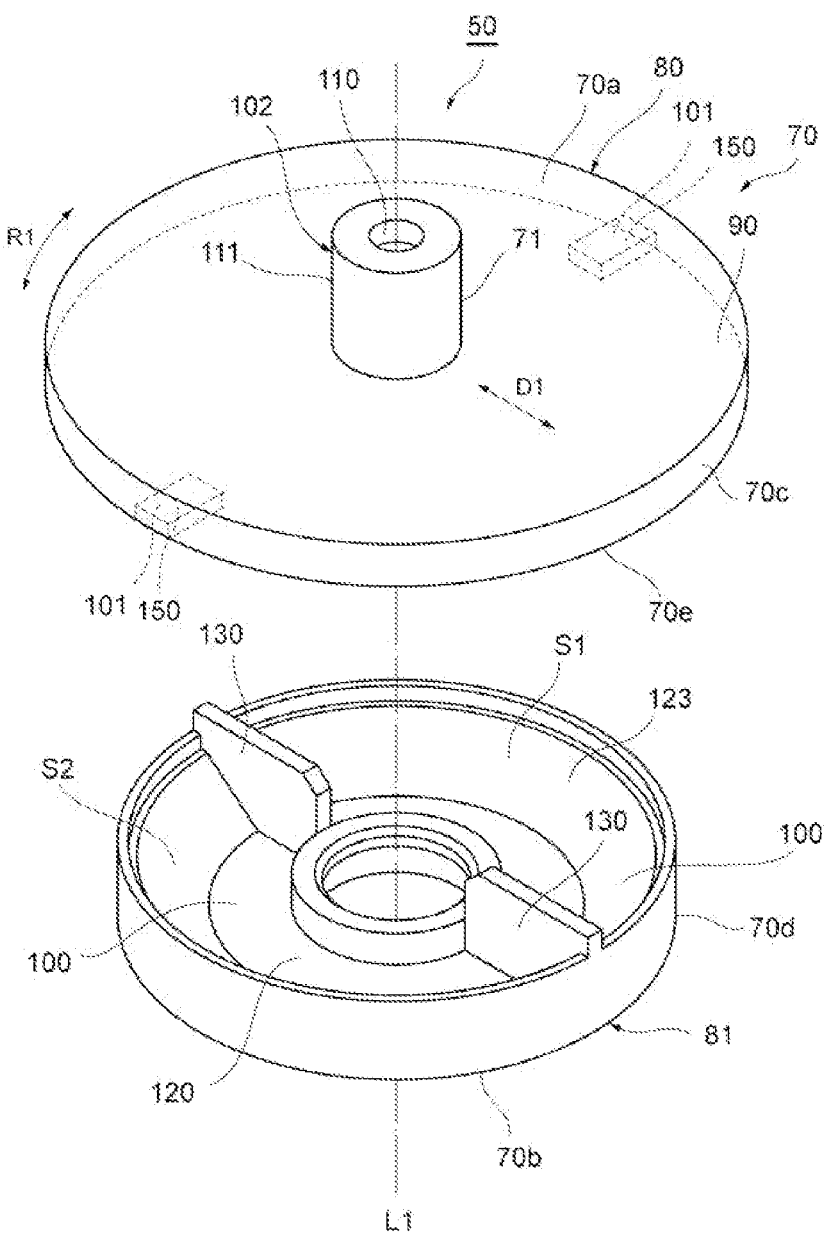
FIG. 4 is an exploded view of the cartridge.
Figure 5:
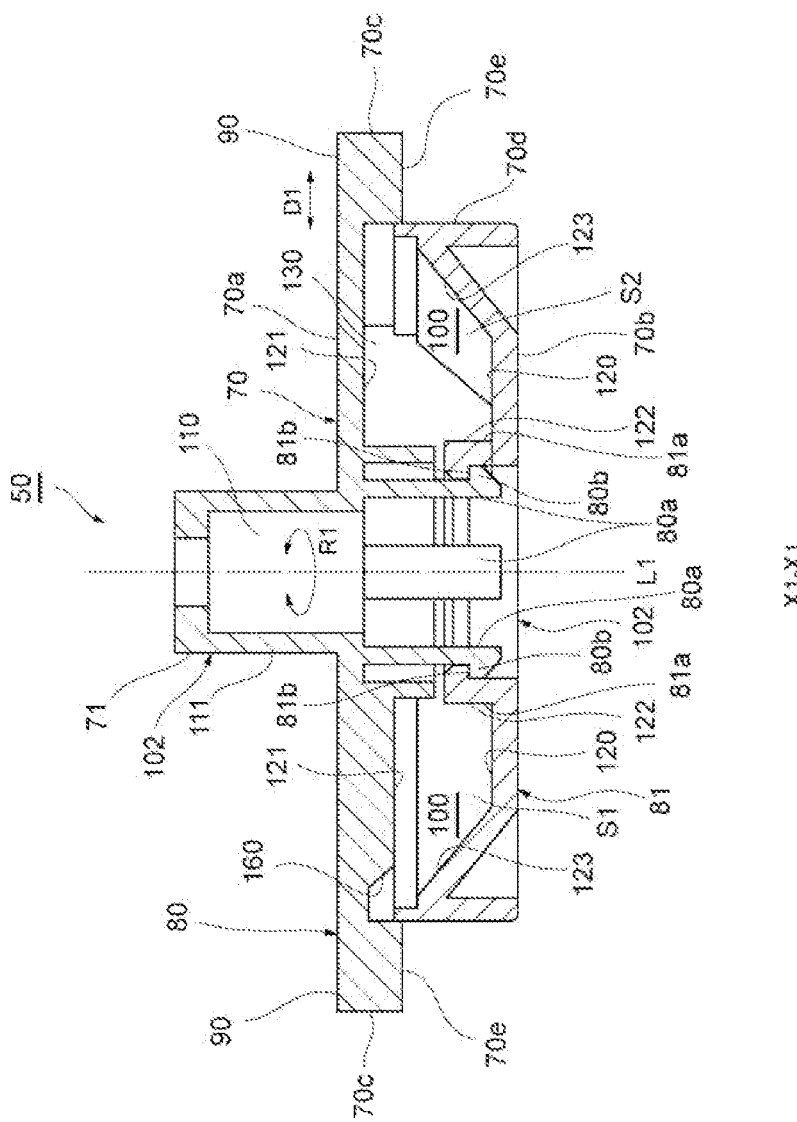
FIG. 5 is a vertical cross section view of the X1-X1 section of the cartridge.
Figure 6:
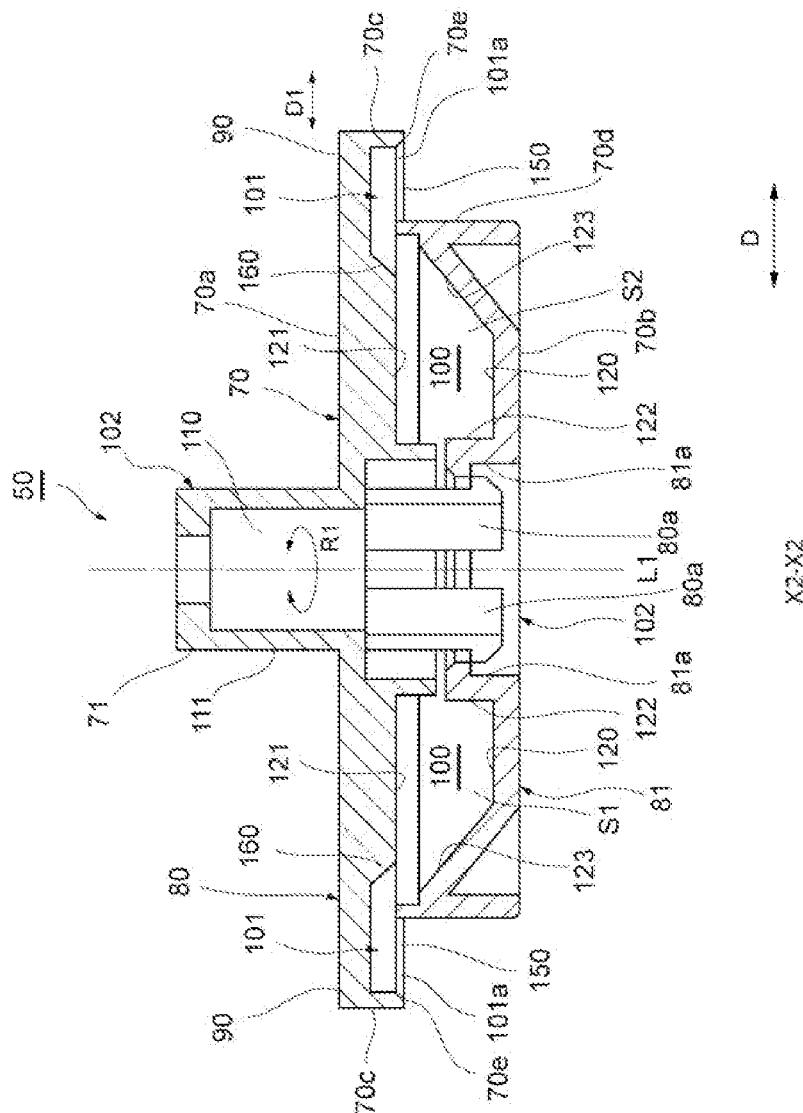
FIG. 6 is a vertical cross section view of the X2-X2 section of the cartridge.
Figure 7:
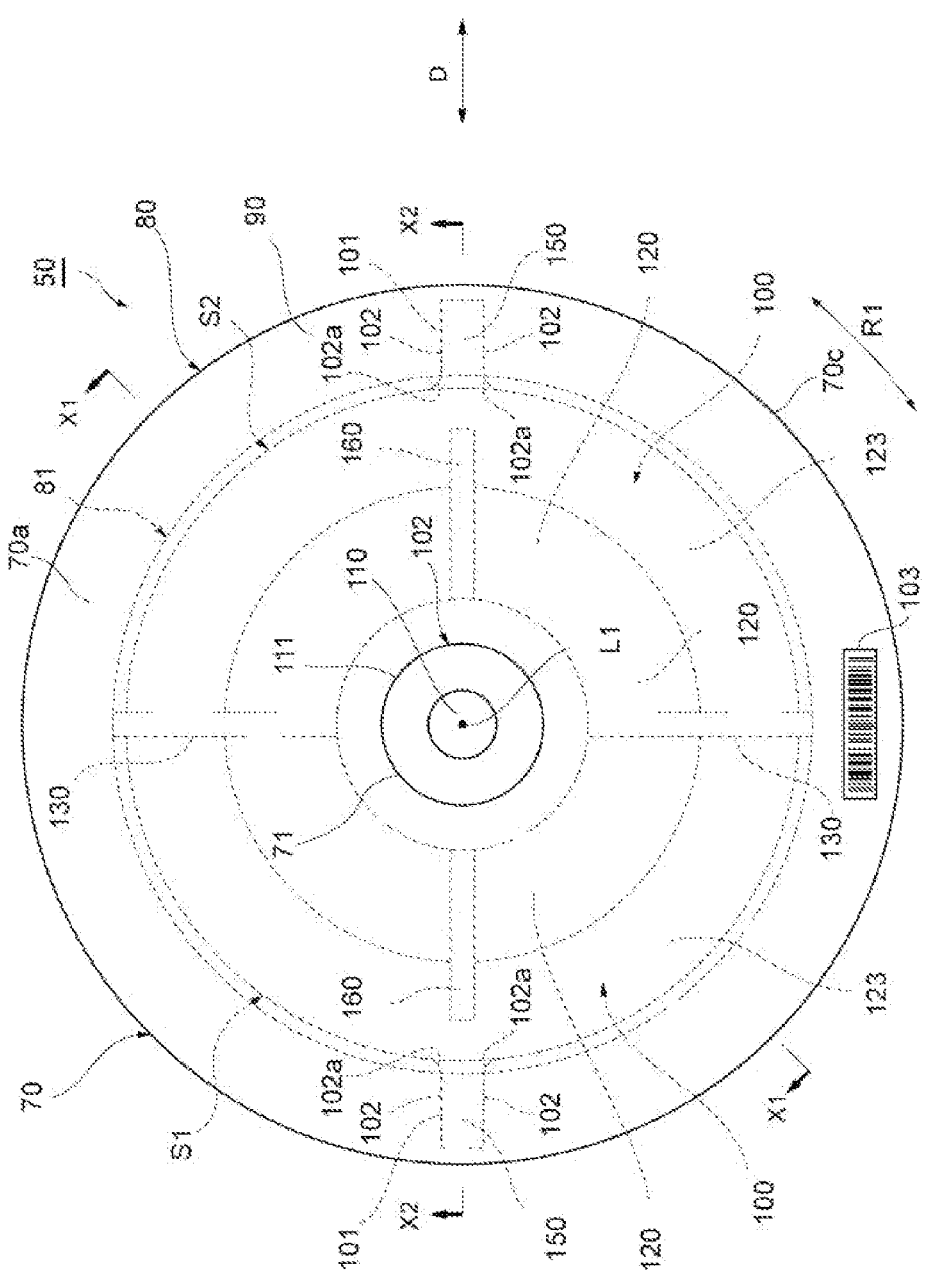
FIG. 7 is a plan view showing the internal configuration of the cartridge.

FIG. 3 is a perspective view of the cartridge 50. FIG. 4 is an exploded view of the cartridge 50. FIG. 5 is a vertical cross section view of the X1-X1 section (shown in FIGS. 3 and 7) of the cartridge 50. FIG. 6 is a vertical cross section view of the X2-X2 section (shown in FIGS. 3 and 7) of the cartridge 50. FIG. 7 is a plan view showing the internal configuration of the cartridge 50. Note that although FIGS. 3 to 7 do not show stirrers for the sake of explanation, a plurality of stirrers are actually accommodated. In this specification, "upper" and "lower" with respect to the cartridge 50 are based on the posture when the cartridge 50 is attached to the sample measuring device 1.

As shown in FIG. 3, the cartridge 50 has a cartridge body 70. The cartridge main body 70 is configured to rotate around a vertically oriented central axis L1. The cartridge main body 70 includes a circular upper surface 70a, a circular lower surface 70b having a smaller diameter than the upper surface 70a, an annular first outer peripheral surface 70c facing the central axis L1 and arranged around the central axis L1, an annular second outer peripheral surface 70d having a diameter smaller than that of the first outer peripheral surface 70c and arranged around the central axis L1, and an annular outer peripheral lower surface 70e facing toward connecting the first outer peripheral surface 70c and the second outer peripheral surface 70d. The cartridge main body 70 also has a substantially cylindrical knob 71 that protrudes upward from the center of the upper surface 70a.

As shown in FIG. 4, the cartridge body 70 is composed of an upper member 80 including an upper surface 70a, a first outer peripheral surface 70c and a lower outer peripheral surface 70e, and a lower member 81 including a lower surface 70b and a second outer peripheral surface 70d, wherein the upper member 80 and the lower member 81 are fitted or adhered to each other. As shown in FIG. 5, the upper member 80 and the lower member 81 are fitted together by inserting one into the other, thereby providing a fitting mechanism. For example, the upper member 80 has a plurality of engaging parts 80a protruding downward from the vicinity of the central axis L1, and the lower member 81 has engaging parts 81a to which the engaging parts 80a are engaged. The engaging part 80a has an outward protrusion 80b, and the engaging part 81a has an inward protrusion 81b. The engaging part 80a is engaged with the engaging part 81a by engaging the projecting parts 80b and 81b with each other.

The upper member 80 and the lower member 81 each have a disk shape, and the upper member 80 has a larger diameter than the lower member 81. The upper member 80 and the lower member 81 are fitted together with their central axes L1 aligned. The outer peripheral portion of the upper member 80 protrudes outward from the lower member 81 to form an annular flange 90.

As shown in FIGS. 3 and 6, the cartridge 50 includes a storage chamber 100 in which a plurality of stirrers are stored, and a discharge outlet for discharging the stirrers in the storage chamber 100 to the outside of the cartridge 50, a discharge chamber 101 for discharging the stirrer in the storage chamber 100 to the outside of the cartridge 50, and an attaching/detaching part 102 for attaching/detaching the cartridge 50 to/from the sample measuring device 1. The storage chamber 100 is provided in the lower member 81 of the cartridge 50, and the discharge chamber 101 and the attaching/detaching part 102 are provided in the upper member 80.

The attaching/detaching part 102 is provided in the center of the cartridge 50. The attaching/detaching part 102 has an attaching/detaching hole 110 passing through the central axis L1 of the cartridge body 70, and a cylindrical part 111 for forming the attaching/detaching hole 110. The attaching/detaching hole 110 and the cylindrical part 111 configure an engagement part that engages with a rotation drive shaft 211 (described later) of the cartridge mounting mechanism 51.

As shown in FIG. 6, the storage chamber 100 is formed inside the cartridge body 70. The storage chamber 100 is annularly provided around the attaching/detaching part 102. The storage chamber 100 has a bottom surface 120, a ceiling surface 121, an inner surface 122 and an outer surface 123. The storage chamber 100 has a volume capable of accommodating 100 or more, preferably 200 or more stirrers. The stirrer has, for example, a cylindrical shape and a size of about 1 mm in diameter and about 4 mm in length. The storage chamber 100 can randomly store a plurality of stirrers so that each stirrer can move freely.

The bottom surface 120 and the ceiling surface 121 are horizontal surfaces, and the inner surface 122 is a vertical surface. The outer surface 123 is an inclined surface that gradually rises in an outward direction.

As shown in FIGS. 3, 4, and 7, the storage chamber 100 is partitioned by a partition plate 130 into a plurality of, for example, two storage areas S1 and S2. Two partition plates 130 are provided at intervals of 180 degrees around the central axis L1.

As shown in FIGS. 3, 4, 6 and 7, the discharge chamber 101 is formed outside the storage chamber 100. The discharge chamber 101 is formed on the flange 90 side of the cartridge 50. The discharge chamber 101 is provided at a plurality of locations, that is, two locations, in the circumferential direction R1 of the cartridge 50. The two discharge chambers 101 are arranged along the outer circumference of the storage chamber 100 at regular intervals, that is, at intervals of 180 degrees. Each discharge chamber 101 is provided at a position corresponding to each storage area S1 and S2 of the storage chamber 100. Each discharge chamber 101 is formed by combining the upper member 80 and the lower member 81 so as to be separated from the central position of the outer periphery of each storage area S1, S2, that is, the partition plate 130 by 90 degrees.

As shown in FIG. 6, the discharge chamber 101 is provided continuously with the inclined outer surface 123 of the storage chamber 100 and is provided at a position higher than the storage chamber 100.

The discharge chamber 101 has a space with dimensions of 1 mm or more and less than 2 mm in height, and 1 mm or more and less than 2 mm in width with respect to the dimensions of the stirrer (1 mm in diameter and 4 mm in length). The discharge chamber 101 has a height and width less than twice the diameter of the rod-shaped stirrer, so that it can accommodate one stirrer. Therefore, the discharge chamber 101 can accommodate one stirrer with the longitudinal direction of the stirrer directed toward the outer direction D of the cartridge 50, and whereas the discharge chamber 101 can accommodate one stirrer, it cannot accommodate two or more stirrers.

The discharge chamber 101 has a horizontal lower surface 101a. The lower surface 101a corresponds to the outer peripheral lower surface 70e of the cartridge main body 70 and the lower surface of the flange 90. A discharge outlet 150 that opens to the outside is formed in the lower surface 101a. The discharge outlet 150 has dimensions slightly larger than the stirrer so that the stirrer falls with the stirrer oriented in the outward direction D. The discharge outlet 150 has, for example, an elongated rectangular shape in the outward direction D. Note that the discharge outlet 150 and the lower surface 101a may be the same size, or the discharge outlet 150 may be smaller than the lower surface 101a.

In the vicinity of the entrance of the discharge chamber 101, a movement restricting part 160 projecting downward is provided. The movement restricting part 160 is provided, for example, on the ceiling surface 121 of the storage chamber 100. As shown in FIGS. 6 and 7, the movement restricting part 160 is formed as a linear protrusion extending outward from the center side of the ceiling surface 121. The movement restricting part 160 can push down other stirrers that are trying to adhere to the stirrer housed in the discharge chamber 101 by magnetic force, and drop them into the storage chamber 100. That is, the movement restricting part 160 has a function of preventing the stirrer in the discharge chamber 101 from being connected to other stirrers. An inlet 102a of a side surface 102 of the discharge chamber 101 in the circumferential direction R1 has a curved shape that gradually widens toward the storage chamber 100 side.

An identification code 103 is attached to the surface of the cartridge 50 and includes identification information such as the part number, lot number, and number of stirrers stored. The identification code 103 can be read by the reader of the sample measuring device 1.

Cartridge Mounting Mechanism

Figure 8:
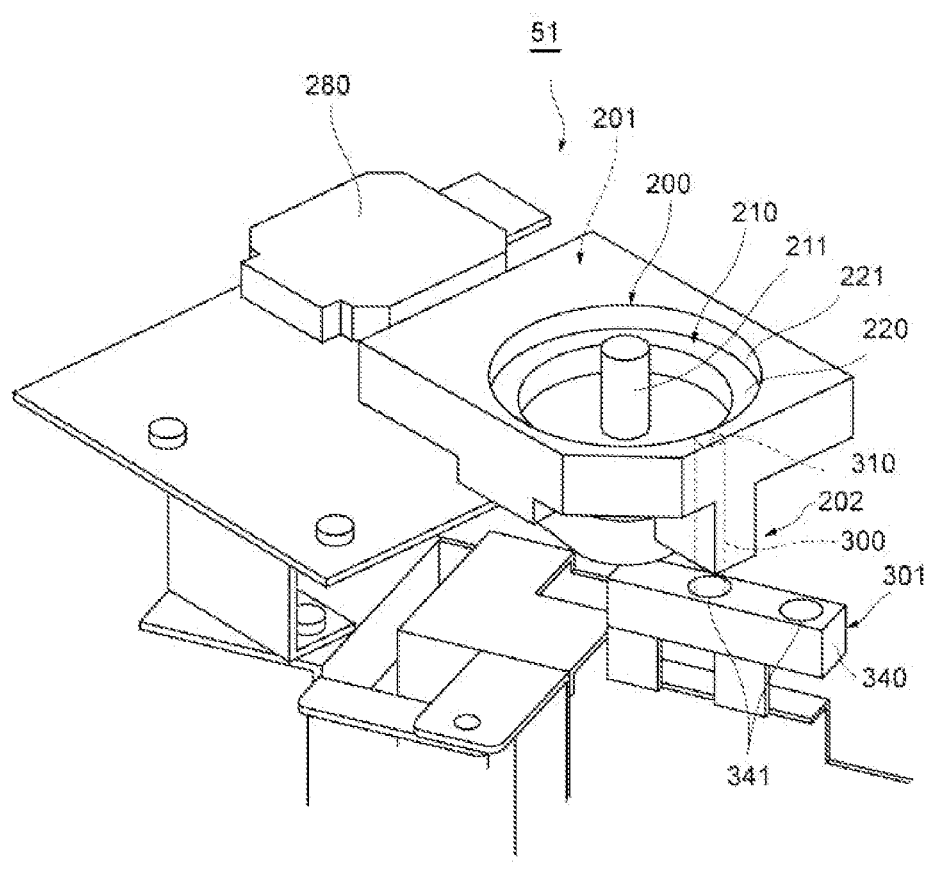
FIG. 8 is an descriptive view showing an outline of the configuration of a cartridge mounting mechanism.

FIG. 8 is an descriptive view showing the configuration of the cartridge mounting mechanism 51. As shown in FIG. 8, the cartridge mounting mechanism 51 includes a mounting unit 200 to which the cartridge 50 is detachably mounted, an take-out unit 201 for discharging the stirrer from the cartridge 50 attached to the mounting unit 200, and a transfer unit 202 for transferring the stirrer to the cuvette.

The mounting unit 200 has a substantially rectangular and thick plate shape. The mounting unit 200 has a concavity 210 for accommodating the cartridge 50 and a rotation drive shaft 211 as an engaging member projecting vertically from the center of the concavity 210. The concavity 210 of the mounting unit 200 is exposed on the surface cover 40 of the work table 30 as shown in FIG. 2.

Figure 9:
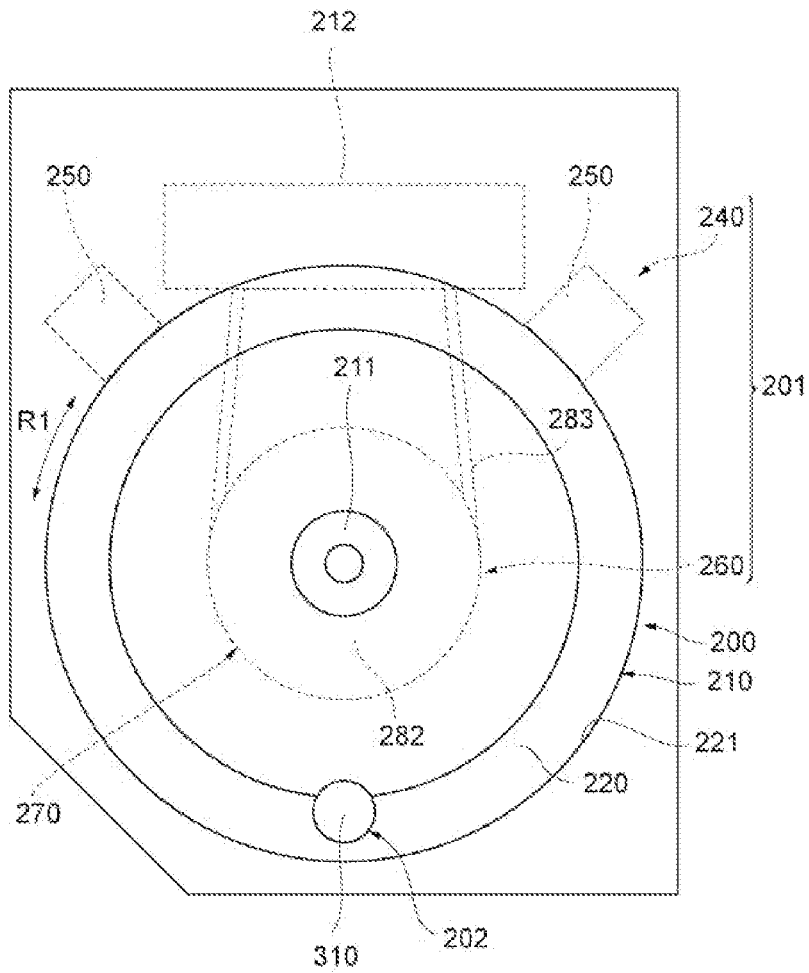
FIG. 9 is an descriptive plan view showing the configuration of a cartridge mounting mechanism.

As shown in FIGS. 8 and 9, the concavity 210 is formed in a substantially circular shape corresponding to the outer shape of the cartridge 50. The concavity 210 covers a mounting surface 220 on which the cartridge 50 is mounted in contact with the flange 90 of the cartridge 50, and an outer peripheral surface 221 that covers the outer peripheral surface (first outer peripheral surface 70c) of the cartridge 50 mounted on the mounting surface 220. The mounting surface 220 is an annular horizontal surface, and the outer peripheral surface 221 is an annular vertical surface. The mounting surface 220 is formed with an loading inlet 310 of the transfer unit 202, which will be described later.

As shown in FIG. 9, the mounting unit 200 has a first sensor 212 that detects that the cartridge 50 is mounted on the mounting unit 200. The first sensor 212 is configured to detect the presence or absence of the cartridge 50 by light. The first sensor 212 is configured to output the detection result of the presence/absence of the cartridge 50 to a control unit 407 which will be described later.

The take-out unit 201 has a first mechanism 240 that moves the stirrer in the cartridge 50 to the discharge outlet 150 provided in the cartridge 50. The first mechanism 240 has two magnets 250 as magnetic force generators that move the stirrer in the cartridge 50 by magnetic force. Two magnets 250 are provided near the outer peripheral surface 221 of the concavity 210. The two magnets 250 are arranged at positions separated from each other by 45 degrees or more, for example, about 90 degrees, along the circumferential direction R1 of the outer peripheral surface 221 of the concavity 210. Each magnet 250 is provided at a position away from the input port 310 of the transfer unit 202. Each magnet 250 is separated from the loading inlet 310 by 90 degrees or more, for example, 135 degrees along the circumferential direction R1 of the concavity 210. The two magnets 250 are provided such that the same magnetic poles face the concavity 210 side. The number of magnets 250 is not limited to two, and may be one or three or more.

The take-out unit 201 has a second mechanism 260 that relatively moves the discharge outlet 150 of the cartridge 50 and the loading inlet 310 of the transfer unit 202 to align the positions of the discharge outlet 150 and the loading inlet 310. The second mechanism 260 has a rotation drive unit 270 that rotates the cartridge 50 around the center axis L1 of the cartridge 50, which extends in the vertical direction.

Figure 10:
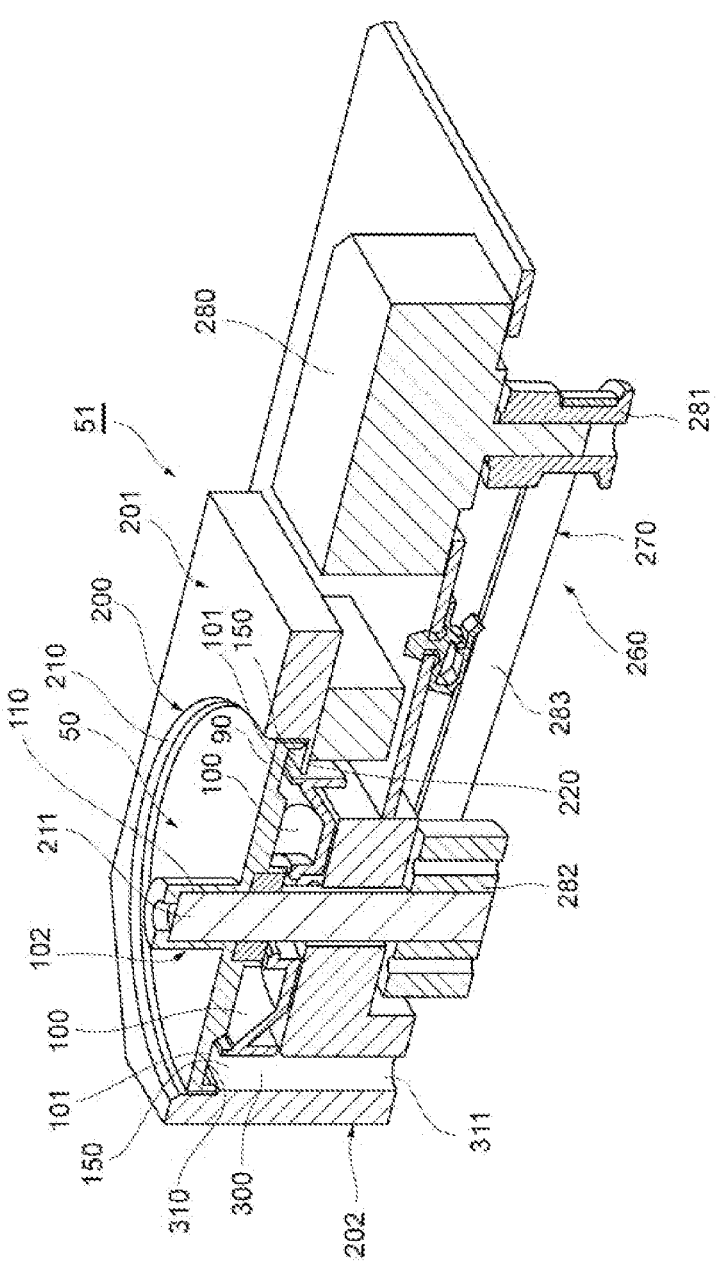
FIG. 10 is an descriptive view of a vertical cross section showing the configuration of the take-out unit of the cartridge mounting mechanism.

FIG. 10 is a vertical cross section view for illustrating the configuration of the cartridge mounting mechanism 51. As shown in FIG. 10, the rotation drive unit 270 includes a motor 280, a first pulley 281 connected to the drive shaft of the motor 280, a rotation drive shaft 211, a second pulley 282 connected to the bottom of the rotation drive shaft 211, and a drive belt 283 for connecting and interlocking the first pulley 281 and the second pulley 282. The motor 280 is provided at a position adjacent to the mounting unit 200 in the horizontal direction. According to this configuration, when the motor 280 is driven, the rotation drive shaft 211 rotates via the first pulley 281, the drive belt 283 and the second pulley 282. When the rotation drive shaft 211 rotates, the cartridge 50 attached to the rotation drive shaft 211 also rotates, the rotation causes the discharge outlet 150 of the cartridge 50 to rotate, and the position of the discharge outlet 150 is positioned at the position of the loading inlet 310.

As shown in FIG. 8, the transfer unit 202 has a passage 300 through which the stirrer passes and a container holding unit 301 that holds the cuvette.

Figure 11:
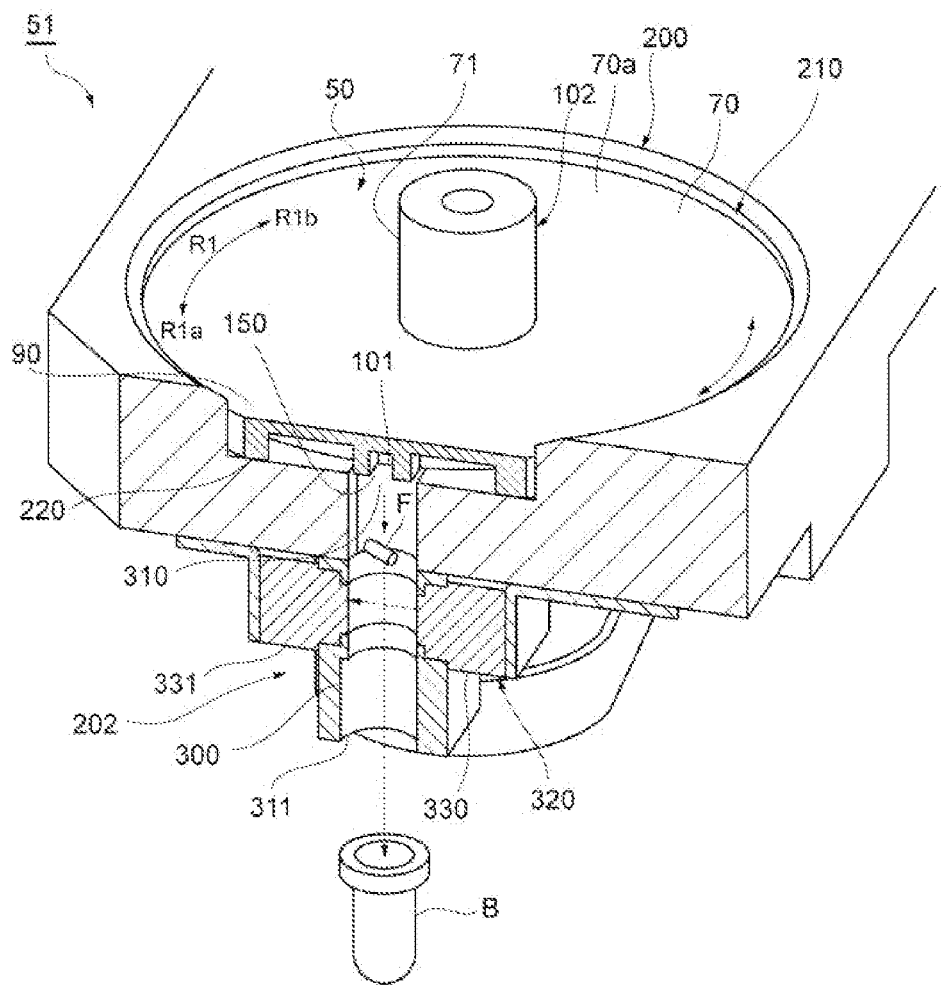
FIG. 11 is an descriptive view of a vertical cross section showing the configuration of the transfer unit of the cartridge mounting mechanism.

FIG. 11 is an illustration of a vertical cross section of the configuration of the transfer unit 202 of the cartridge mounting mechanism 51. As shown in FIG. 11, passage 300 has a cylindrical shape extending in the vertical direction. Passage 300 has a loading inlet 310 at its upper end and a discharge outlet 311 at its lower end. Loading inlet 310 and discharge outlet 311 are circular, for example. A second sensor 320 is provided in the middle of the passage 300 to detect the stirring bar discharged from the cartridge 50 and passing through the passage 300.

The second sensor 320 has a light-emitting part 330 that emits light horizontally toward the passage 300 and a light-receiving part 331 that receives the light emitted from the light-emitting part 330. The tip end surfaces of the light emitting part 330 and the light receiving part 331 configure part of the inner surface of the passage 300 and are aligned with the other inner surface of the passage 300 so as not to form a step.

Figure 12:
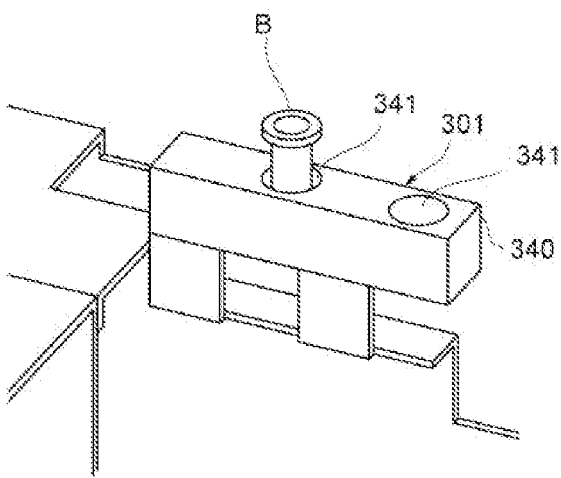
FIG. 12 is an descriptive diagram showing the configuration of a container holding unit.

As shown in FIG. 12, the container holding unit 301 has a substantially rectangular parallelepiped holding portion main body 340 and a plurality of insertion holes 341 formed in the holding portion main body 340 into which the cuvette B can be inserted. The container holding unit 301 is configured such that the cuvette B inserted into the insertion hole 341 is supported by the holding portion main body 340.

Internal Structure of Sample Measuring Device

Figure 13:
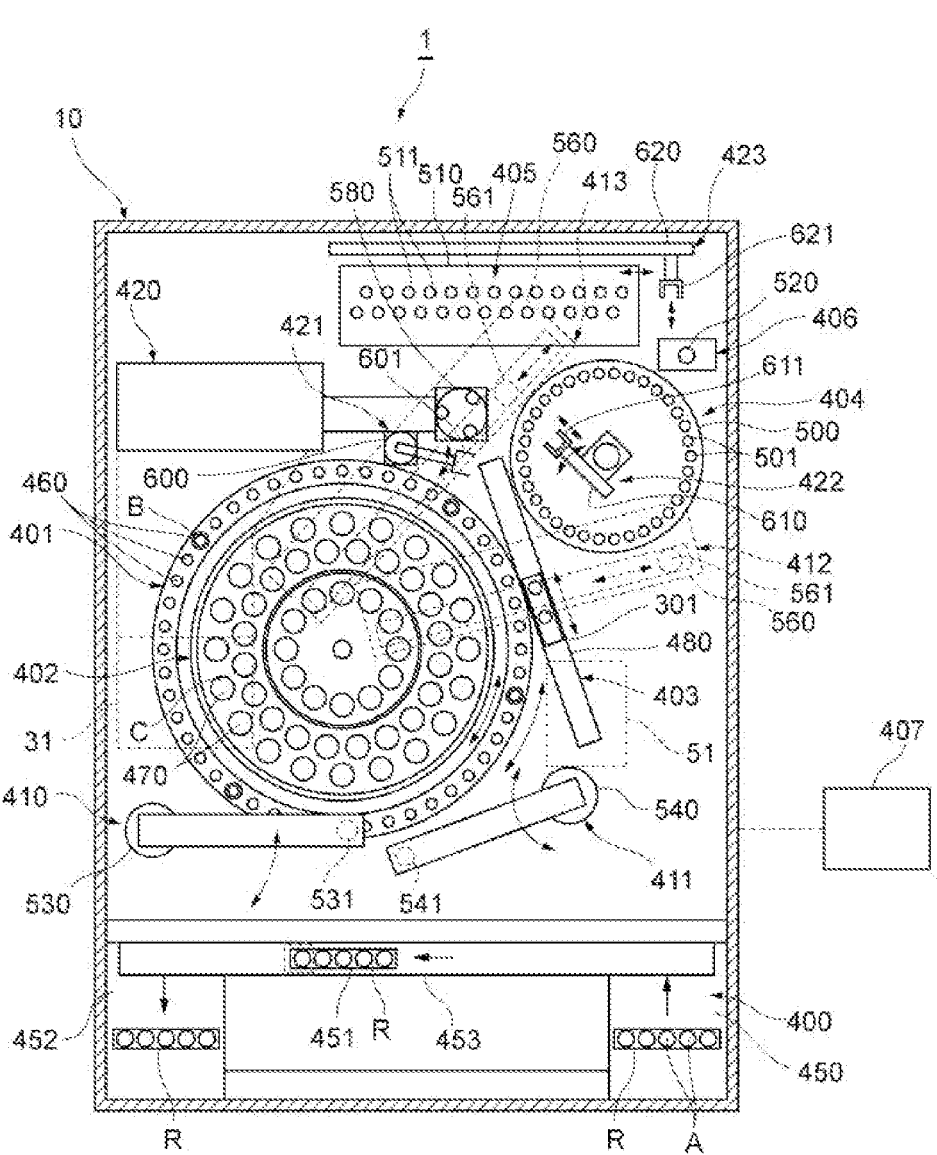
FIG. 13 is an descriptive view showing the internal configuration of the sample measuring device.

As shown in FIG. 13, the sample measuring device 1 includes, within a housing 10, a sample container loading unit 400 for loading a sample container A containing a collected sample, a first table 401 that holds the cuvette B that hold the sample in a circular arrangement during measurement, a second table 402 holding a plurality of reagent containers C containing reagents to be mixed with the sample, a third table 403 holding a cuvette B and loading a stirrer into the cuvette B, a heating unit 404 that holds and heats the cuvette B, a measuring unit 405 that holds a cuvette B and measures a measurement sample in which a sample and a reagent are mixed in the cuvette B, a discharge chamber 406 for discharging the cuvette B for which measurement has been completed, a cartridge mounting mechanism 51, a control unit 407 and the like.

The sample measuring device 1 includes a sample dispensing arm 410 for dispensing the sample in the sample container A loaded into the sample container loading unit 400 into the cuvette B on the first table 401 as a liquid dispensing unit that dispenses the liquid into the cuvette B, a sample dispensing arm 411 for dispensing the sample in the sample container A of the sample container loading unit 400 or the sample in the cuvette B on the first table 401 into the cuvette B on the third table 403, and two reagent dispensing arms 412, 413 for dispensing the reagent in the reagent container C of the second table 402 into the cuvette B, and the like.

The sample measuring device 1 further includes a cuvette supply mechanism 420 for supplying the cuvette B to the device main body as a cuvette transport unit that transports the cuvette B, a first transfer arm 421 for transferring the cuvette B supplied by the cuvette supply mechanism 420 to the first table 401 or the third table 403, a second transport arm 422 for transporting the cuvette B on the first table 401 or the third table 403 to the heating unit 404, a third transport arm 423 for transporting the cuvette B in the heating unit 404 to the measurement unit 405 and the discharge chamber 406, and the like.

In plan view, the sample container loading unit 400 is arranged on the front side inside the housing 10, and the first table 401 and the second table 402 are arranged near the center inside the housing 10. The third table 403, the heating unit 404, and the cartridge mounting mechanism 51 are arranged on the right side of the housing 10. The cartridge mounting mechanism 51 is arranged on the front side of the heating unit 404. The measuring unit 405 is arranged on the rear surface (back surface) side inside the housing 10. The discharge chamber 406 is arranged between the heating unit 404 and the measuring unit 405. The cuvette supply mechanism 420 is arranged on the left side inside the housing 10 between the measuring unit 405 and the first table 401.

The sample container loading unit 400 includes a rack loading unit 450 for loading a rack R containing a plurality of sample containers A, a sample suction unit 451 that is reachable by the sample dispensing arms 410 and 411 for suctioning samples from the sample containers A on the rack R by the sample dispensing arms 410 and 411, a rack unloading unit 452 for unloading the rack R of the sample container A into which the sample has been suctioned, and a transport mechanism 453 for transporting the rack R to the rack loading unit 450, the sample suction unit 451, and the rack unloading unit 452 in this sequence. The transport mechanism 453 transports the rack R using, for example, a conveyor.

The first table 401 has an annular shape and is configured to be rotatable by a drive unit. The first table 401 has a plurality of cuvette holders 460 that hold the cuvette B. The cuvette holders 460 are arranged at regular intervals along the entire circumference.

The second table 402 is arranged inside the first table 401. The second table 402 has a disc shape and is configured to be rotatable by a drive unit. The second table 402 includes a plurality of reagent container holders 470 that hold reagent containers C. The reagent container holders 470 are arranged, for example, in multiple concentric circles. The reagent container holders 470 are arranged, for example, at regular intervals along the circumferential direction.

The third table 403 includes the above-described container holding unit 301 for holding the cuvette B, and a transport mechanism 480 for transporting the container holding unit 301. For example, the transport mechanism 480 can hold the container holding unit 301 and move it from the vicinity of the lower portion of the cartridge mounting mechanism 51 to the vicinity of the heating unit 404.

Figure 14:
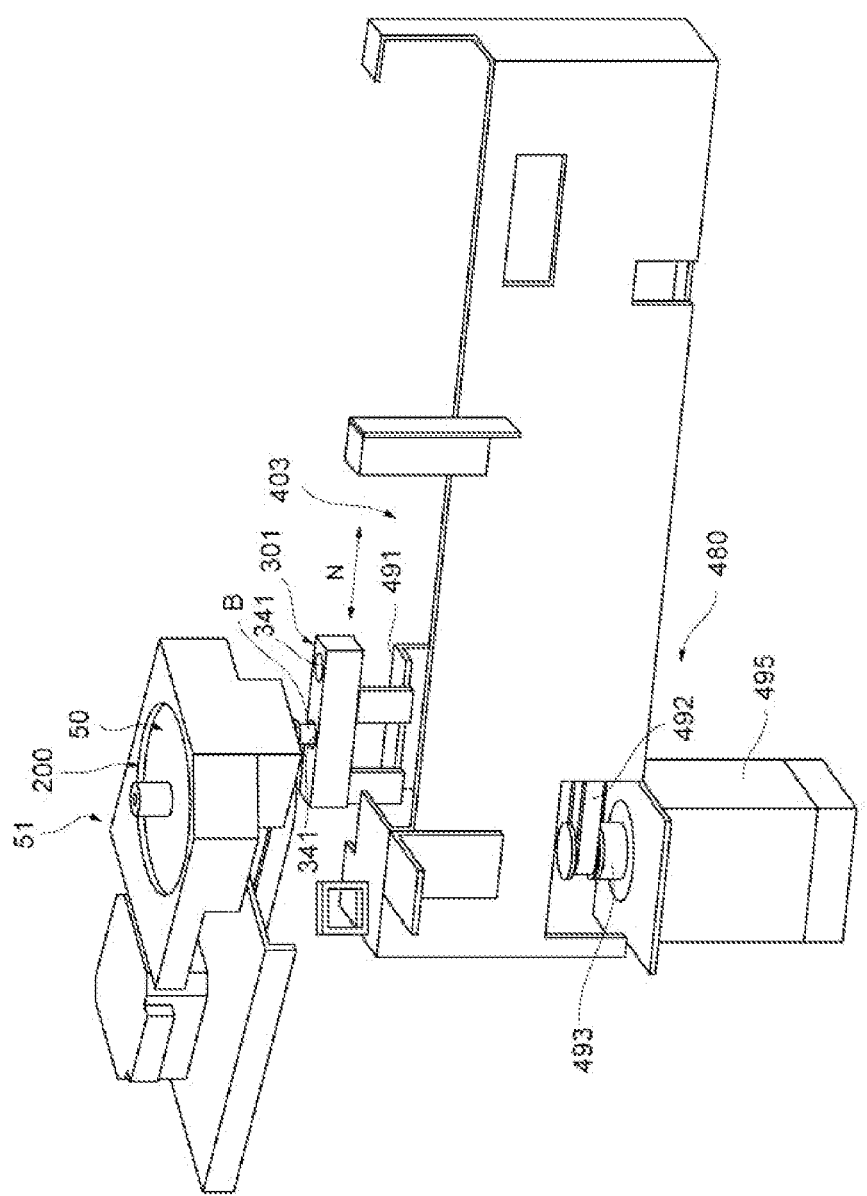
FIG. 14 is an descriptive diagram showing the configuration of a transport mechanism for a third table.
Figure 15:
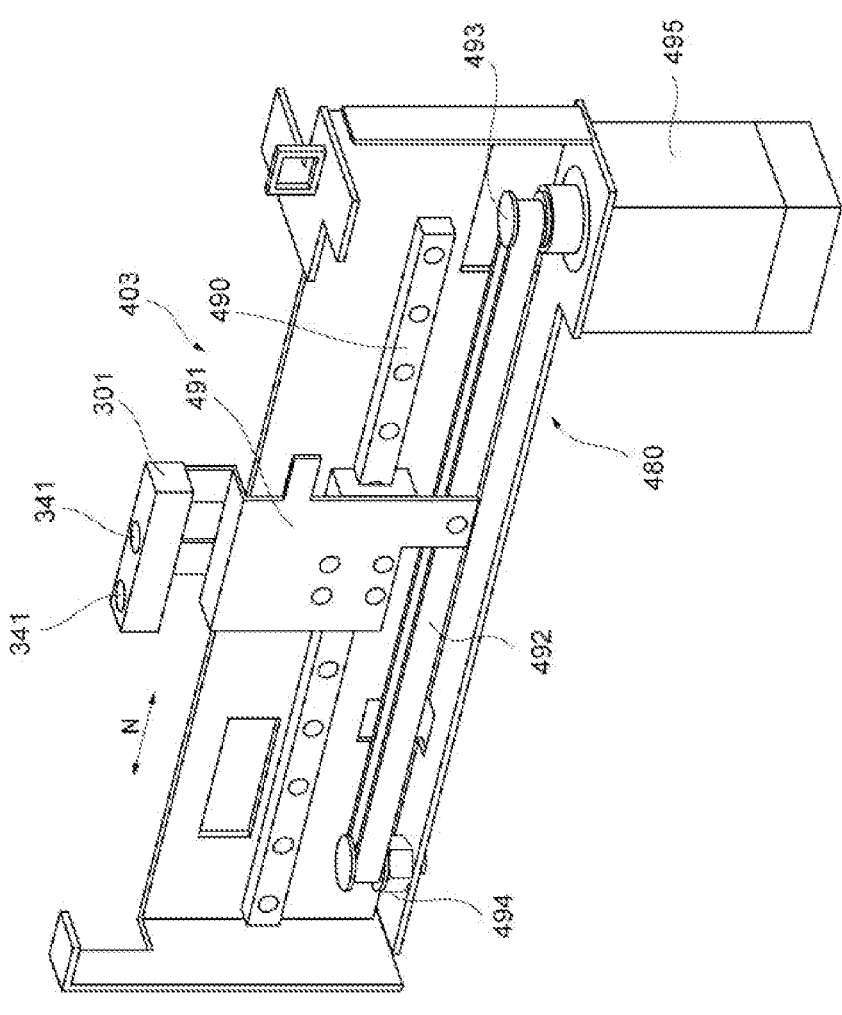
FIG. 15 is an descriptive diagram showing the configuration of a transport mechanism for a third table.

FIGS. 14 and 15 are descriptive diagrams illustrating the configuration of the transport mechanism 480. The transport mechanism 480 shown in FIGS. 14 and 15 includes a rail 490 extending horizontally longitudinal direction of the third table 403 (N direction in FIG. 15), a slider 491 to which the container holding unit 301 is fixed and which moves on the rail 490, a drive belt 492 extending in the N direction, a pair of pulleys 493 and 494 on which both ends of the drive belt 492 are hung, and a motor 495 that rotationally drives the single pulley 493. The transport mechanism 480 is driven by a motor 485 to move the drive belt 492 via pulleys 493 and 494, thereby moving the slider 491, and horizontally moving the container holding unit 301 fixed to the slider 491. According to this configuration, the third table 403 moves the container holding unit 301 from the loading position where the stirrer is introduced directly below the passage 300 of the cartridge mounting mechanism 51 to a position at which the cuvette B can be transferred by the first transfer arm 421 or the second transfer arm 422 near the heating unit 404.

As shown in FIG. 13, the heating unit 404 has a circular heating plate 500. The heating plate 500 has a plurality of cuvette holders 501 that hold cuvette B. The cuvette holders 501 are arranged, for example, at regular intervals along the entire circumference near the outer circumference of the heating plate 500. The heating plate 500 has a heat source and can heat the liquid in the cuvette B held by the cuvette holder 501 to a predetermined temperature.

The measuring unit 405 has a rectangular measuring plate 510. The measuring plate 510 has a plurality of cuvette holders 511 that hold the cuvette B. The cuvette holders 511 are arranged in multiple rows along the longitudinal direction of the measurement plate 510, for example. The measuring unit 405 can irradiate light on the cuvette holding unit 511 from the irradiating unit, receive the light transmitted through the measurement sample in the cuvette B with the light receiving unit, and measure the sample from the light receiving result.

The discharge chamber 406 has a discharge hole 520 through which the cuvette B is discharged. The discharge hole 520 communicates with a cuvette collection section provided at the bottom of the housing 10.

The sample dispensing arm 410 is arranged between the sample suction unit 451 of the sample container loading unit 400 in the housing 10 and the first table 401 in plan view. The sample dispensing arm 410 includes a drive unit 530 that drives the sample dispensing arm 410, and a nozzle 531 that dispenses and suctions the sample.

The drive unit 530 includes, for example, a rotation drive unit that rotates the sample dispensing arm 410 in the planar direction between the sample suction unit 451 and the first table 401, and an elevator drive unit that moves the sample dispensing arm 410 up and down. The nozzle 531 is provided at the tip of the sample dispensing arm 410, and can suction and dispense the sample with a pump. According to this configuration, the sample dispensing arm 410 reaches the sample container A of the sample suction unit 451, suctions the sample, moves above the first table 401, and dispenses the sample into the cuvette B of the first table 401.

The sample dispensing arm 411 is arranged between the sample suction unit 451 of the sample container loading unit 400 between the housing 10 and the third table 403 in plan view. The sample dispensing arm 411 includes a drive unit 540 that drives the sample dispensing arm 411, and a nozzle 541 that dispenses and suctions the sample.

The drive unit 540 includes, for example, a rotation drive unit for rotating the sample dispensing arm 411 in the planar direction between the sample suction unit 451, the first table 401, and the third table 403, and an elevator drive unit for moving the sample dispensing arm 411 up and down. The nozzle 541 is provided at the tip of the sample dispensing arm 411, and can suction and dispense the sample with a pump. According to this configuration, the sample dispensing arm 411 reaches the cuvette B of the first table 401 or the sample container A of the sample suction unit 451, suctions the sample, moves above the third table 403, and dispenses the sample into cuvette B in table 403. Note that the sample suction unit 451 is provided at two positions, one at which the sample dispensing arm 410 suctions the sample and the other at which the sample dispensing arm 411 dispenses the sample.

The reagent dispensing arms 412 and 413 each have an elongated arm 560 and a nozzle 561 below in plan view. The arm 560 of the first reagent dispensing arm 412 extends from above the second table 402 to near the heating unit 404. Arm 560 of second reagent dispensing arm 413 extends from second table 402 to the vicinity of measuring unit 405. The arm 560 is fixed to the ceiling of the housing 10, for example.

The nozzle 561 is configured to be movable in the longitudinal direction and the vertical direction with respect to the arm 560 by a drive unit. The nozzle 561 of the first reagent dispensing arm 412 is movable along the arm 560 from above the second table 402 to near above the heating plate 500 of the heating unit 404. The nozzle 561 of the second reagent dispensing arm 413 is movable along the arm 560 from above the second table 402 to near above the measuring plate 510 of the measuring unit 405. The nozzle 561 can suction and dispense the reagent by a pump. The nozzle 561 also is equipped with a heat source, and can heat the suctioned reagent to a predetermined temperature. According to this configuration, the nozzle 561 of the first reagent dispensing arm 412 reaches the reagent container C of the second table 402, suctions the reagent, moves to the vicinity of the heating plate 500, and dispenses the sample into the cuvette B held by the second transport arm 422. Further, the nozzle 561 of the second reagent dispensing arm 413 reaches the reagent container C on the second table 402, suctions the reagent, moves to the vicinity of the measurement plate 510, and dispenses the sample into the cuvette B held by the transport arm 423.

The cuvette supply mechanism 420 can store empty cuvette B supplied from the cuvette supply unit 31 and sequentially supply the cuvette B to the cuvette unloading unit 580.

The first transfer arm 421 is arranged, for example, between the cuvette supply mechanism 420 and the first table 401 in plan view. The first transfer arm 421 has a drive unit 600 that drives the first transfer arm 421, and a cuvette holding unit 601 that holds the cuvette B. The drive unit 600 includes, for example, a rotation drive unit that rotates the first transfer arm 421 in the planar direction between the cuvette unloading unit 580 of the cuvette supply mechanism 420 and the first table 401, and an elevator drive unit for moving the first transfer arm 421 up and down. The cuvette holder 601 is provided at the tip of the first transfer arm 421 and has, for example, a U shape, and can hold the cuvette B between the arms of the U shape. According to this configuration, the first transport arm 421 holds the cuvette B in the cuvette unloading unit 580 of the cuvette supply mechanism 420 and the container holding unit 301 of the third table 403, and moves the cuvette B on the to the cuvette holder 460 of the first table 401. The first transport arm 421 holds the cuvette B in the cuvette unloading unit 580 of the cuvette supply mechanism 420, moves the cuvette B onto the third table 403, and places it on the container holding unit 301 of the third table 403.

The second transport arm 422 is arranged, for example, on the heating plate 500 of the heating unit 404. The second transfer arm 421 has a drive unit 610 that drives the second transfer arm 422, and a cuvette holding unit 611 that holds the cuvette B. The drive unit 610 includes, for example, a rotation drive unit that rotates the second transfer arm 422 in the planar direction between the first table 401, the third table 403, and the heating plate 500, a elevator drive unit for moving the second transfer arm 422 up and down, and an expansion and contraction drive unit for expanding and contracting the second transfer arm 422 in the horizontal direction. The cuvette holder 601 is provided at the tip of the first transfer arm 421 and has, for example, a U shape, and can hold the cuvette B between the arms of the U shape. According to this configuration, the second transport arm 422 holds the cuvette B in the cuvette holding unit 460 of the first table 401 and the container holding unit 301 of the third table 403, and moves the cuvette B below the nozzle 561 of the first reagent dispensing arm 412 or moves the cuvette B to the cuvette holder 501 of the heating plate 500.

The third transfer arm 423 is arranged on the rear surface side of the measuring unit 405 inside the housing 10 in plan view. The third transfer arm 423 has a drive unit 620 for driving the third transfer arm 423, and a cuvette holding unit 621 for holding the cuvette B. The drive unit 620 has a drive mechanism that moves the third transfer arm 423 in the left-right direction, the front-rear direction, and the up-down direction. The cuvette holding unit 621 is provided at the tip of the third transfer arm 423, has a U-shape, for example, and can hold the cuvette B between the arms of the U shape. According to this configuration, the third transport arm 423 holds the cuvette B in the cuvette holding unit 501 of the heating plate 500, moves the cuvette B to below the nozzle 561 of the second reagent dispensing arm 413 or moves the cuvette B to the cuvette holder 511 of the measurement unit 405. The third transport arm 423 can transport the cuvette B for which measurement has been completed to the discharge chamber 406.

Figure 16:
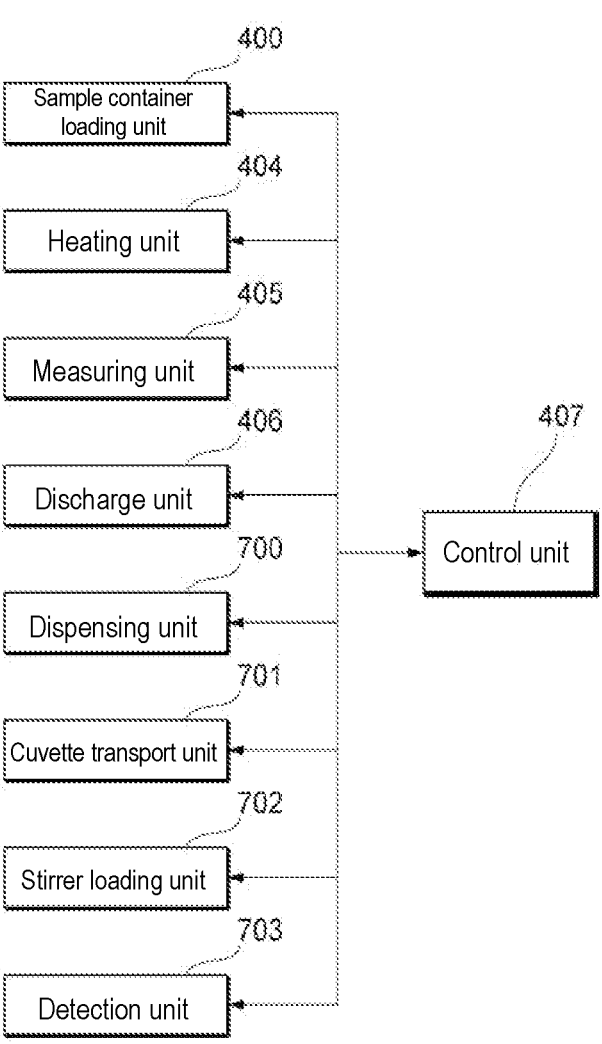
FIG. 16 is a block diagram showing the configuration of a sample measuring device.

FIG. 16 is a block diagram showing the configuration of a sample measuring device 1. As shown in FIG. 16, the control unit 407 controls devices that execute various steps of sample measurement, namely, the sample container loading unit 400, the heating unit 404, the measuring unit 405, the discharge chamber 406, the dispensing unit 700 (sample dispensing unit), arms 410, 411, reagent dispensing arms 412, 413), cuvette transport unit 701 (cuvette supply mechanism 420, first transport arm 421, second transport arm 422, third transport arm 423, third table 403), stirrer loading unit 702 (cartridge mounting mechanism 51, third table 403), detection unit 703 (first sensor 212, second sensor 320), and the like. The control unit 407 performs sample measurement based on information from various devices including the measuring unit 405. The control unit 407 includes, as hardware, a memory, a CPU, an input unit for various information, a display unit for various information, a communication unit, and the like. The control unit 407 can control various devices and perform sample measurement by executing programs recorded in the memory by the CPU.

The display 11 shown in FIG. 1 may have functions such as an input section and a display section of the control section 407.

Sample Measuring Method

Figure 17:
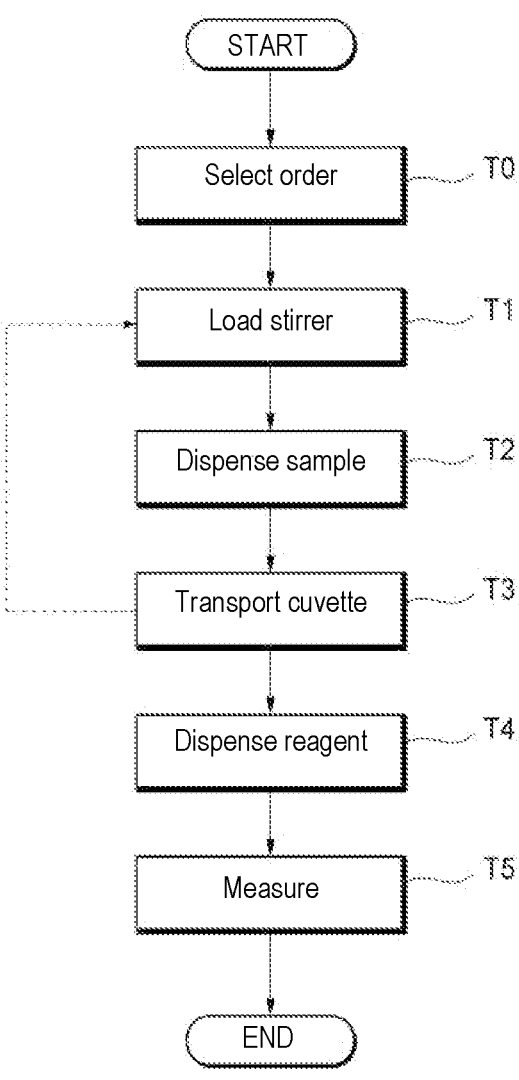
FIG. 17 is a flow diagram showing main steps in a sample measuring method.
Figure 18:
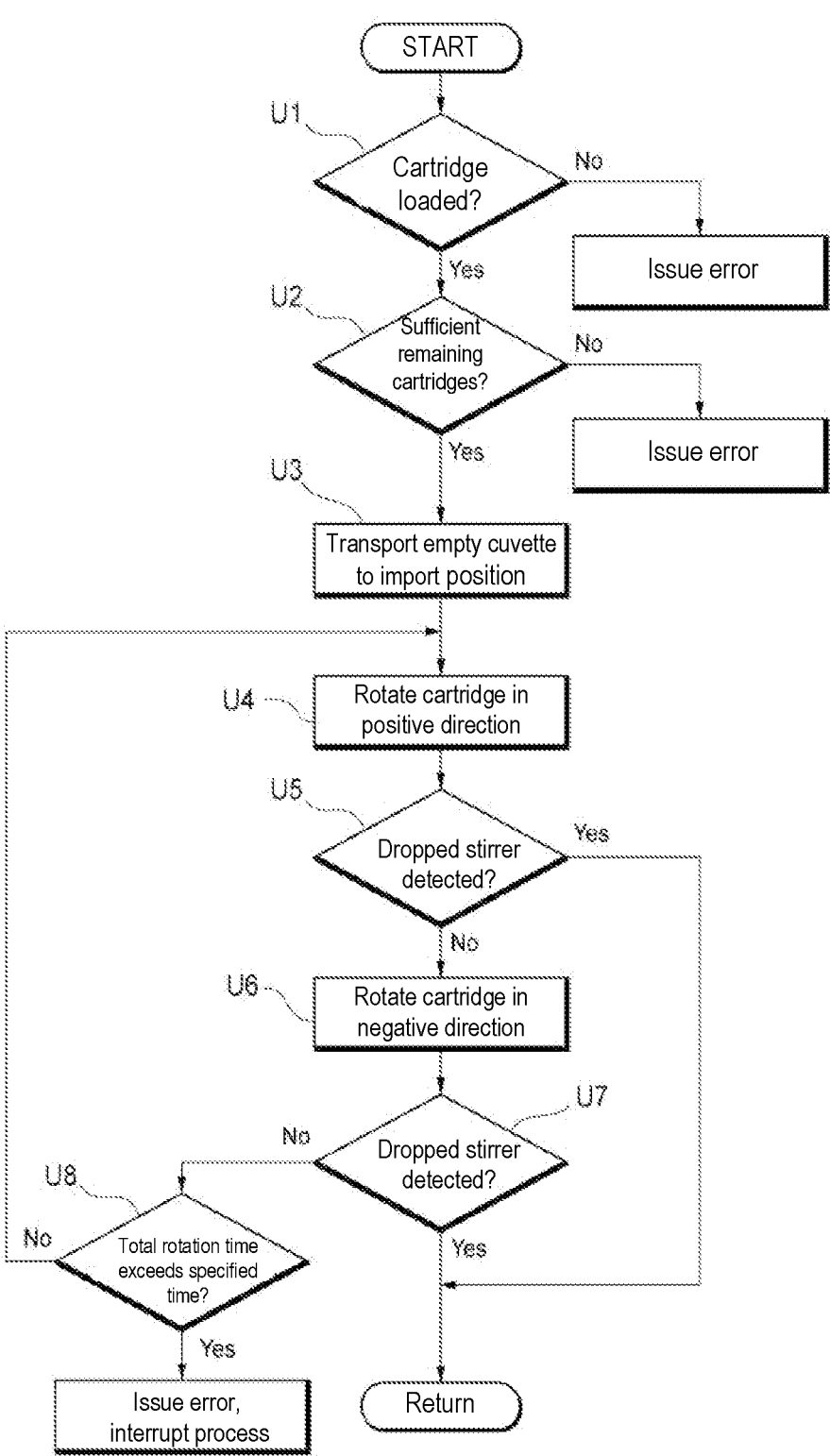
FIG. 18 is a flow diagram showing a stirring bar input step in the sample measuring method.

Next, a sample measuring method performed by the sample measuring device 1 configured as described above will be described. In this embodiment, an example in which platelet aggregation is measured as sample measurement will be described. FIG. 17 is a flow chart showing main steps in the sample measuring method. FIG. 18 is a flow chart showing the step of loading the stirrer in the sample measuring method.

Figure 19:
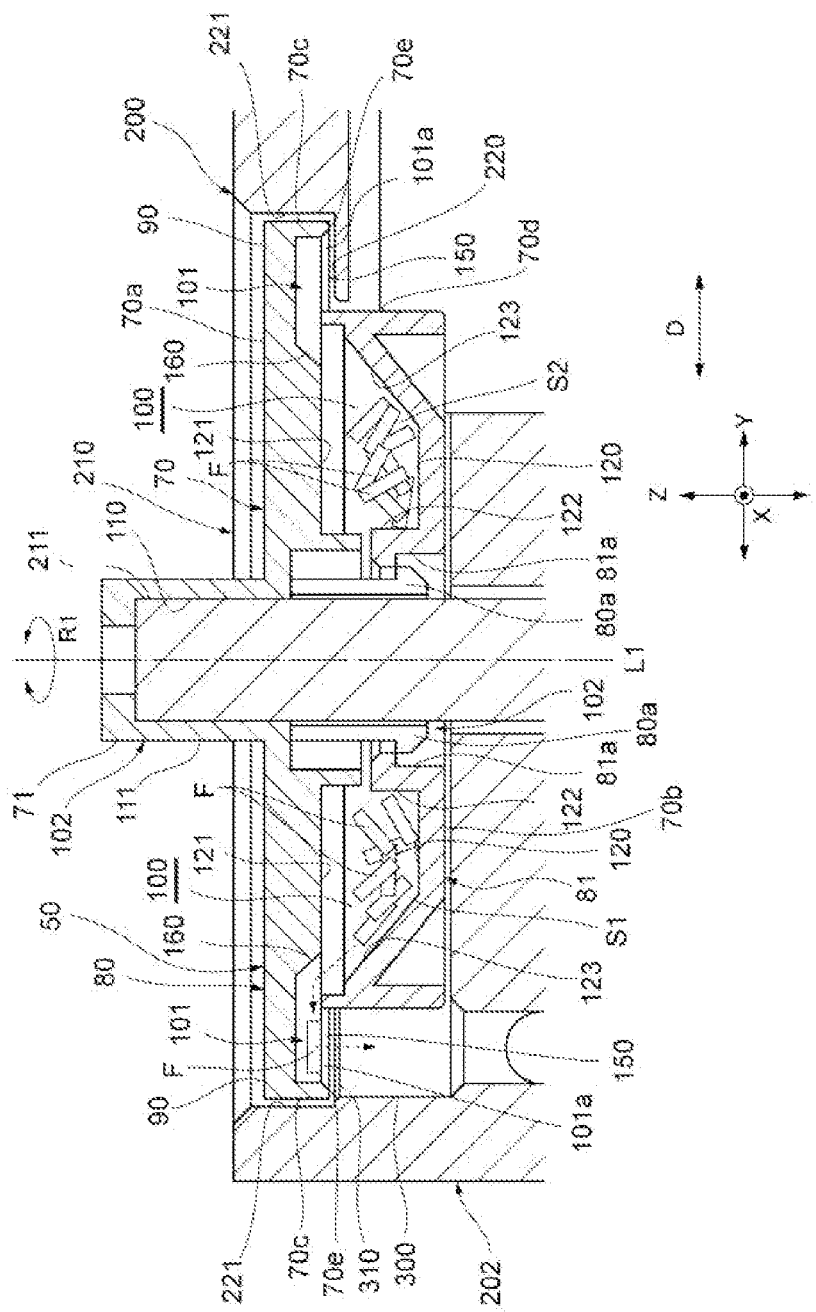
FIG. 19 is a vertical section view of a cartridge mounted in a cartridge mounting mechanism.
Figure 20:
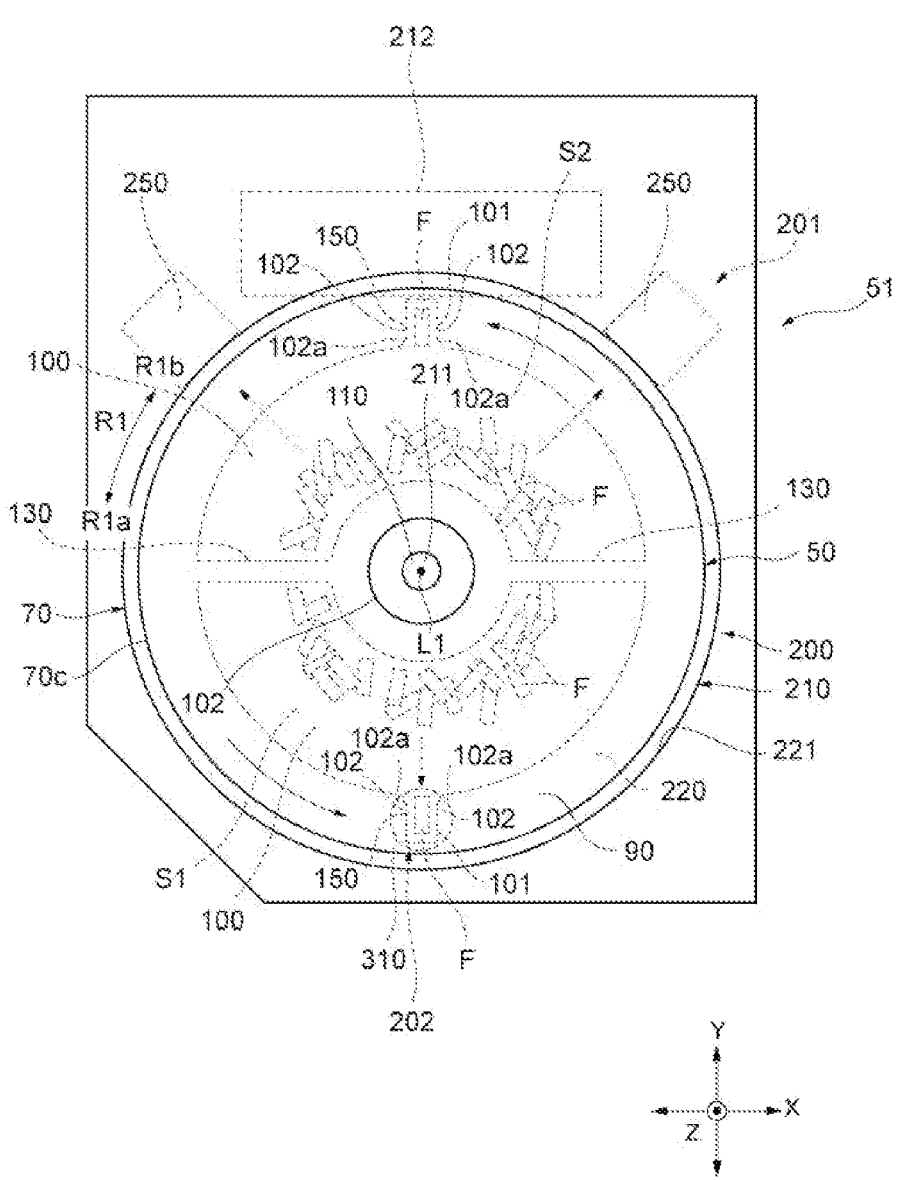
FIG. 20 is a plan view of a cartridge mounted in a cartridge mounting mechanism.

First, a cartridge 50 containing a specified number of stirrers is prepared. In the cartridge 50, for example, 100 stirrers are accommodated and enclosed in each of the storage areas S1 and S2. The stirrer is, for example, ferritic stainless steel with ferromagnetic properties. Before the measurement process is started in the sample measuring device 1 or when the measurement process is stopped, the user opens the front cover 20 and installs the cartridge 50 to the mounting unit 200 of the cartridge mounting mechanism 51. The cartridge 50 is fitted into the concavity 210 of the mounting unit 200 exposed on the surface cover 40 of the work table 30. At this time, as shown in FIGS. 10, 19, and 20, the rotation drive shaft 211 of the mounting unit 200 is inserted into the attaching/detaching hole 110 of the attaching/detaching unit 102 of the cartridge 50, and the rotary drive shaft 211 and the cartridge 50 are fixed. The flange 90 with the discharge outlet 150 of the cartridge 50 is mounted on the mounting surface 220 which has the loading inlet 310 of the recess 210. Note that the identification code 103 of the cartridge 50 shown in FIG. 7 may be read by a reading device before the cartridge 50 is mounted. Note that the identification code may be two-dimensional, three-dimensional, or an RF tag.

Next, an order selection step T0 shown in FIG. 17 is performed in the sample measuring device 1. In the order selection T0, the desired measurement order is selected by the user from among the platelet aggregation measurement order performed with a stirrer placed in the cuvette B and various measurement orders performed without a stirrer placed in the cuvette B. For example, the selection of the measurement order is performed by the user's input on the display screen of the display 11. In the order selection T0, when the platelet aggregation measurement order is selected, the stirrer loading step T1 is started. Note that when a measurement order other than the platelet aggregation measurement order is selected, steps T2 to T5, which will be described later, are performed without performing loading step T1. The stirrer loading step T1 may be started before the measurement process of the sample measuring device 1, at the start of the measurement process, during the measurement process, or the like. First, the first sensor 212 confirms that the cartridge 50 is attached to the mounting unit 200 (step U1 in FIG. 18). If the cartridge 50 is not attached to the mounting unit 200, an error is issued, and a warning is displayed and sounded on the display 11 or the like.

If the cartridge 50 is attached to the mounting unit 200, then the remaining amount of the stirrers in the cartridge 50 is checked (step U2 in FIG. 18). For example, the control unit 407 counts the number of used stirrers in the measurement processes that has already been performed, and subtracts the used number from the current number of stirrers in the cartridge 50 to confirm the remaining amount. Note that the remaining amount may be confirmed by subtracting the number of used stirrers from the initial amount. Then, the expected number of stirrers to be used and the remaining amount of stirrers in the measurement processes to be performed from now on are compared, and if the remaining amount of stirrers is not sufficient, an error is issued and displayed on the display 11.

The planned number of stirrers to be used and the remaining amount of stirrers are compared, and if the remaining amount of stirrers is sufficient, an empty cuvette B on the third table 403 is placed in the path 300 of the transfer unit 202 (process U3 in FIG. 18). This empty cuvette B is transported from the cuvette unloading unit 580 of the cuvette supply mechanism 420 shown in FIG. 13 directly below the passage 300 of the mounting mechanism 51. Note that two cuvette B also may be held by the container holding unit 301 and the two cuvette B may be sequentially transported directly below the passage 300. When a measurement order other than the platelet aggregation measurement order is selected (for example, when the cuvette supply mechanism 420 and the first transfer arm 421 are not used), two cuvette B may be held.

Next, the motor 280 of the rotation drive unit 270 in the take-out unit 201 shown in FIG. 10 is driven, the rotation drive shaft 211 rotates, and the cartridge 50 rotates in a predetermined first direction (positive rotation direction R1$a$) (process U4 in FIG. 18). The rotation speed at this time is, for example, 50 rpm or more and 100 rpm or less.

As shown in FIGS. 19 and 20, the storage chamber 100 of the cartridge 50 randomly accommodates a plurality of stirrers F so as to be freely movable. For example, a plurality of stirrers are housed in a three-dimensional space in the X, Y, and Z directions which are orthogonal to each other, facing in random and irregular directions. Here, the X direction is one horizontal direction of the cartridge 50, the Y direction is a horizontal direction perpendicular to the X direction, and the Z direction is a vertical direction. A plurality of stirrers F housed in the storage chamber 100 of the cartridge 50 are attracted by the magnets 250 and move outward while contacting the partition plate 130. One stirrer F enters the discharge chamber 101. At this time, even if the other stirrer F tries to stick to the stirrer F that has entered the discharge chamber 101 by magnetic force, it hits the movement restricting part 160 and is dropped and returned to the storage chamber 100. When the cartridge 50 continues to rotate while one stirrer F is housed in the discharge chamber 101 and the positions of the discharge outlet 150 of the discharge chamber 101 and the loading inlet 310 of the transfer unit 202 are aligned, the stirrer F in the discharge chamber 101 is carried out from the discharge outlet 150 into the loading inlet 310. Here, one or two or more magnets 250 may be provided, but if two or more are provided, the probability of attracting the stirrer F while the cartridge 50 is being rotated increases.

Stirrer F drops through passage 300 and is introduced into empty cuvette B of third table 403. At this time, the stirrer F passing through the passage 300 shown in FIG. 11 is detected by the second sensor 320 (step U5 in FIG. 18). At this time, it is determined whether the stirrer F has been transferred to the cuvette B based on the detection result. When the stirrer is detected in the passage 300, the motor 280 of the rotation drive unit 270 is stopped, and the rotation of the cartridge 50 is stopped.

When the stirrer F is not detected in the passage 300 for a predetermined time, the motor 280 rotates the cartridge 50 in the second direction opposite to the first direction (reverse rotation direction R1$b$) (step U6 in FIG. 18). Stirrer F passing through passage 300 is detected by second sensor 320 (step U7 in FIG. 18). When the stirrer F is detected in the passage 300, the rotation of the cartridge 50 is stopped, and the stirrer loading step T1 is completed.

When the stirrer F is not detected in the passage 300, whether the total rotation time of the cartridge 50 exceeds the specified time is confirmed (step U8 in FIG. 18). When the stirrer F is not detected in the passage 300 and the total rotation time of the cartridge 50 does not exceed the designated time, the cartridge 50 rotates again in the forward rotation direction R1$a$. If the stirrer F is not detected in the passage 300 and the total rotation time of the cartridge 50 exceeds a predetermined specified time, an error is issued and the measurement process is interrupted.

After the stirrer loading step T1 shown in FIG. 17, the sample dispensing step T2 and the cuvette transporting step T3 are successively performed. First, as shown in FIG. 13, a rack R containing a plurality of sample containers A is loaded into the rack loading unit 450 of the sample container loading unit 400. The rack R is transported to the sample suction unit 451 by the transport mechanism 453.

Next, the sample dispensing arm 411 suctions the sample from the sample container A on the rack R and dispenses the suctioned sample into the cuvette B on the third table 403 into which the stirrer F is introduced. Next, on the third table 403, the stirrer F and the cuvette B containing the sample are transported to the heating unit 404 side by the transport mechanism 480. Then, the cuvette B is transferred from the third table 403 to the heating unit 404 by the second transfer arm 422.

As another aspect, the cuvette B in which the stirrer F of the third table 403 is introduced is first transported to the heating unit 404 side by the transport mechanism 480 before the sample is dispensed, and then transported to the first table 401 by the first transport arm 421. Then, the sample dispensing arm 410 suctions the sample from the sample container A on the rack R and dispenses the suctioned sample into the cuvette B on the first table 401. Next, the stirrer F and the cuvette B containing the sample are transferred from the first table 401 to the heating unit 404 by the second transfer arm 422.

The cuvette B transported to the heating unit 404 is heated to a predetermined temperature. Cuvette B is then held by the second transport arm 422 and moved below the first reagent dispensing arm 412.

When the transport step T3 for one cuvette B is completed, the next cuvette B is subjected to the loading step T1 of the stirrer F, the sample dispensing step T2, and the cuvette transporting step T3.

Subsequently, reagent dispensing step T4 and measuring step T5 shown in FIG. 17 are performed. First, the reagent in the reagent container C on the second table 402 is suctioned by the nozzle 561 of the first reagent dispensing arm 412, heated to a predetermined temperature, and dispensed into the cuvette B held by the second transfer arm 422. In this way the sample and the reagent in the cuvette B are mixed.

The cuvette B is then transferred to the heating plate 500 of the heating unit 404 by the second transfer arm 422. Here, the mixture of the sample and the reagent in the cuvette B is heated to a predetermined temperature.

The cuvette B is held by the third transport arm 423 and moved below the second reagent dispensing arm 413, for example. Next, the nozzle 561 of the second reagent dispensing arm 413 suctions the reagent from the reagent container C on the second table 402, and dispenses the suctioned reagent into the cuvette B held by the third transfer arm 423. In this way the sample in the cuvette B and the reagent are mixed to form a measurement sample.

The cuvette B is then transferred to the measuring plate 510 of the measuring unit 405 by the third transfer arm 423. Note that in some cases, the reagent may not be dispensed by the second reagent dispensing arm 413.

The measurement sample in the cuvette B is measured in the measuring unit 405. At this time, the stirrer in the cuvette B stirs by the magnetic force as the measurement sample is stirred. Then, the measurement sample in the cuvette B is irradiated with light, the light transmitted through the measurement sample is received, and the received light information is obtained as measurement data. The measurement data are sent from the measuring unit 405 to the control unit 407 and analyzed. At this time, the platelet aggregation rate is calculated based on the absorbance or transmittance of the measurement sample.

After the measurement in the measuring unit 405 is completed, the cuvette B is transported to the discharge chamber 406 by the third transport arm 423 and discharged. Thus, the measuring process for one cuvette B is completed.

The sample measuring method according to the present embodiment includes, in a storage chamber 100 of the cartridge 50 attached to the sample measuring device 1, an input step of inputting a predetermined number of stirrers F into the cuvette B from a storage chamber 100 in which a plurality of stirrers F are movably stored; a dispensing step of dispensing the sample into the cuvette B; and a measuring step of measuring the sample in the cuvette B into which the stirrer F is loaded. According to the sample measuring method of the present embodiment, since the stirrer F is put into the cuvette B from the storage chamber 100 of the cartridge 50 attached to the sample measuring device 1, the frequency at which the user loads the stirrer F into the device is can be reduced. In addition, when the stirrer F is loaded into the cuvette B, contamination of the cuvette B with foreign matter can be suppressed. By using the cartridge 50, the user does not touch the stirrer F, and contamination of the cuvette B with foreign matter can be significantly reduced.

In the sample measuring method, since the stirrer F housed in the storage chamber 100 of the cartridge 50 is moved to the discharge outlet 150 provided in the cartridge 50 and discharged from the cartridge 50 through the discharge outlet 150, the stirrer F can be discharged appropriately without foreign matter adhering to the stirrer F.

In the sample measuring method, the stirrer F is dropped and discharged from the discharge outlet 150, so that the stirrer F can be discharged appropriately using a simple device.

In the sample measuring method, the stirrer F is moved to the discharge outlet 150 by magnetic force, so that the stirrer F can be properly discharged using a simple device.

In the sample measuring method, the discharge outlet 150 of the cartridge 50 and the input inlet 310 provided in the sample measuring device 1 are relatively moved, the positions of the discharge outlet 150 and the input inlet 310 are aligned, and the stirring bar is F is discharged from the outlet 150 and into the inlet 310. In this way the stirrer F can be appropriately loaded from the outlet 150 of the cartridge 50 into the inlet 310 of the sample measuring device 1.

In the sample measuring method, since the cartridge 50 is rotated around the central axis L1 of the cartridge 50 in the vertical direction, and the position of the discharge outlet 150 and the position of the input inlet 310 are aligned, the stirrer F can be easily introduced into the inlet 310 using a simple device.

In the sample measuring method, the stirrer F discharged from the cartridge 50 is loaded into the cuvette B through the passage 300 provided in the sample measuring device 1, so that the stirrer F can be appropriately introduced.

In the sample measuring method, since the stirrer F is put into the cuvette B held by the container holding unit 301 provided in the sample measuring device 1, the stirrer F can be put into the cuvette B more reliably.

In the sample measuring method, since the stirrer F discharged from the cartridge 50 is detected, and based on the detection result, it is determined whether the stirrer F has been transferred to the cuvette B, it can be confirmed that the stirrer F has been transferred to the cuvette B. In addition, the sample measuring device 1 can be easily controlled so that two stirrers F do not enter one cuvette B.

In the sample measuring method, since the stirrer F is used in the platelet aggregation test, the platelet aggregation test can be performed with high accuracy without contamination by foreign matter.

In the sample measuring method, the platelet aggregation rate is calculated based on the measured absorbance or transmittance of the sample, so the platelet aggregation test can be performed with high accuracy.

The cartridge 50 in this embodiment includes a plurality of stirrers F, a storage chamber 100 in which the plurality of stirrers F are stored, a discharge chamber 101 having a discharge outlet 150 for discharging the stirrers F from the storage chamber 100, and an attaching/detaching part 102 for attaching/detaching to/from the sample measuring device 1. According to the cartridge 50 of the present embodiment, since the cartridge 50 housing a plurality of stirrers F can be attached to the sample measuring device 1, and the stirrers F can be discharged from the cartridge 50 and transferred to the cuvette B, the user can reduce the frequency of loading the stirrer F into the device. In addition, when the stirrer F is loaded into the cuvette B, contamination of the cuvette B with foreign matter can be suppressed.

The discharge chamber 101 has dimensions capable of accommodating a predetermined number of stirrers F, for example, one stirrer F. In this way the stirrers F can be discharged from the cuvette B one by one, so that one stirrer F can be put into one cuvette B.

The cartridge 50 is configured such that the position of the discharge chamber 101 is higher than the position of the storage chamber 100 when the cartridge 50 is attached to the sample measuring device 1. In this way it is easier for the plurality of stirrers F housed in the storage chamber 100 to disperse toward the discharge chamber 101, and as a result, one stirrer F can easily enter the discharge chamber 101. Therefore, it becomes easy to discharge the stirrers F one by one from the cartridge 50 and put them into the cuvette B.

The cartridge 50 includes an outer surface 123 that gradually rises from the bottom surface 120 of the storage chamber 100 toward the bottom surface 101a of the discharge chamber 101. In this way it easier for the plurality of stirrers F housed in the storage chamber 100 to disperse toward the discharge chamber 101, and as a result, one stirrer F can easily enter the discharge chamber 101. Therefore, it becomes easy to discharge the stirrers F one by one from the cartridge 50 and put them into the cuvette B.

The cartridge 50 further includes a movement restricting part 160 provided near the inlet of the discharge chamber 101 and protruding downward. In this way when another stirrer F tries to follow a stirrer F in the discharge chamber 101, the other stirrer F hits the movement regulating part 160 and is returned to the storage chamber 100, thereby facilitating the discharge of the stirrers F one by one.

The storage chamber 100 has a plurality of storage areas S1 and S2 separated from each other by a partition plate 130, and the discharge outlet 150 is provided in each of the plurality of storage areas S1 and S2. In this way the plurality of stirrers F are dispersed by the partition plate 130, so that the plurality of stirrers F are suppressed from gathering and sticking to each other. As a result, it becomes easier for the stirrers F to enter the discharge chamber 101 one by one.

The attaching/detaching part 102 has an engaging part (the attaching/detaching hole 110 and the cylindrical part 111) that engages with an engaging member (the rotary drive shaft 211) provided in the sample measuring device 1. In this way the cartridge 50 can be suitably attached to and detached from the sample measuring device 1.

The cartridge 50 has a disk-like shape, the attaching/detaching part 102 is provided in the center of the disk shape of the cartridge 50, the storage chamber 100 is provided around the attaching/detaching part 102, and The storage chamber 100 is provided around the attachment/detachment portion 102, and the discharge chamber 101 is provided outside the storage chamber 100. In this way the stirrer F in the storage chamber 100 is easily guided to the discharge chamber 101 by a force acting in one direction on the outer peripheral side of the cartridge 50, such that the movement of the stirrer F to the discharge chamber 101 and the discharge from the discharge outlet 150 are suitably performed.

The sample measuring device 1 according to the present embodiment includes a mounting unit 200 to which a cartridge 50 containing a plurality of stirrers F is detachably mounted, a take-out unit 201 for removing the stirrer F from the cartridge 50 attached to the mounting unit 200, a transfer unit 202 for transferring the stirrer F removed from the cartridge 50 to the cuvette B, a dispensing unit 700 that dispenses the sample into the cuvette B, and a measuring unit 405 for measuring the sample in the cuvette B to which the stirrer F has been transferred. According to the cartridge 50 of the present embodiment, since a cartridge 50 containing a plurality of stirrers F can be attached to the sample measuring device 1, and the stirrer F can be taken out from the cartridge 50 and transferred to the cuvette B, the user can reduce the frequency of loading the stirrers F into the device. In addition, when the stirrer F is loaded into the cuvette B, contamination of the cuvette B with foreign matter can be suppressed.

Since the mounting unit 200 is provided on the surface cover 40 of the sample measuring device 1, the user can easily attach and detach the cartridge 50 to and from the sample measuring device 1.

Since the mounting unit 200 has the concavity 210 in which the cartridge 50 is accommodated, the user can easily attach and detach the cartridge 50 to and from the sample measuring device 1.

Since the mounting unit 200 has an engaging member (rotary driving shaft 211) with which the cartridge 50 is detachably engaged, the cartridge 50 can be suitably mounted on the sample measuring device 1.

The take-out unit 201 has a first mechanism 240 for moving the stirrer F stored in the cartridge 50 to the discharge outlet 150 provided in the cartridge 50. In this way the stirrer F can be suitably moved within the cartridge 50.

The first mechanism 240 has a magnet 250 that moves the stirrer F stored in the cartridge 50 by magnetic force. In this way the cartridge 50 stirrer F can be moved appropriately using a simple mechanism.

The transfer unit 202 has a loading inlet 310 into which the stirrer F removed from the cartridge 50 is introduced, and the take-out unit 201 has a second mechanism 260 that relatively moves the discharge outlet 150 of the cartridge 50 and the loading inlet 310 of the transfer unit 202 to match the positions of the outlet 150 and the inlet 310. In this way the stirrer F can be appropriately loaded from the outlet 150 of the cartridge 50 into the inlet 310 of the transfer unit 202.

The second mechanism 260 has a rotation drive unit 270 that rotates the cartridge 50 around the center axis L1 of the cartridge 50, which extends in the vertical direction of the cartridge 50. In this way the stirrer F can be suitably loaded into the loading inlet 310 of the transfer unit 202 using a simple mechanism.

The transfer unit 202 has a passage 300 through which the stirrer F passes. In this way the stirrer F can be transferred to the cuvette B appropriately.

The transfer unit 202 has a container holding unit 301 that holds the cuvette B, and is configured to transfer the stirrer F to the cuvette B held by the container holding unit 301. In this way the transfer of the stirrer F to the cuvette B can be reliably performed.

The sample measuring device 1 further includes a second detection unit (second sensor 320) for detecting the stirrer F discharged from the cartridge 50. In this way it is possible to confirm that the stirrer F has been discharged from the cartridge 50. In addition, the sample measuring device 1 can be easily controlled so that two stirrers F do not enter one cuvette B.

The sample measuring device 1 includes a first detection unit (first sensor 212) for detecting the presence or absence of the cartridge 50 attached to the mounting unit 200. In this way it is possible to confirm that the cartridge 50 is attached to the sample measuring device 1.

Although the preferred embodiments of the present invention have been described above with reference to the accompanying drawings, the present invention is not limited to such examples. It is obvious that a person skilled in the art can conceive of various modifications within the scope of the idea described in the claims, and it is understood that these modifications also belong to the technical scope of the present invention.

For example, although in the above-described embodiments, the second mechanism 260 of the take-out unit 201 of the sample measuring device 1 has a rotation drive unit 270 that rotates the cartridge 50 around the central axis L1 of the cartridge 50 that extends in the vertical direction, the position of the discharge outlet 150 and the position of the loading inlet 310 may be suitably changed by moving the cartridge 50 in the horizontal plane to relatively move the discharge outlet 150 of the cartridge 50 and the loading inlet 310 of the transfer unit 202. Also in this case, the magnet 250 of the first mechanism 240 may move the stirrer F in the cartridge 50 to the discharge outlet 150. The cartridge 50 also may be moved irregularly in the horizontal plane to align the position of the discharge outlet 150 with the position of the loading inlet 310, or the cartridge 50 may be moved regularly in the horizontal plane to align the discharge outlet 150 with the position of the loading inlet 310.

The sample measuring device 1 also may include a plurality of cartridge mounting mechanisms 51. In such a case, even if the stirrers F of the cartridge 50 mounted on the mounting mechanism 51 of one cartridge become depleted, the stirrers F of the cartridge 50 mounted on the mounting mechanism 51 of another cartridge can be supplied to the cuvette B. The cartridge mounting mechanism 51 also may include a plurality of mounting units 200 and discharge chambers 201. In such a case, for example, the transfer unit 202 may have a passage 300 for each mounting unit 200, and the plurality of passages 300 may merge and have one outlet

311. In this case, it is preferable that the receiving position of the stirrer F becomes singular.

In the above embodiment, the take-out unit 201 is configured to move the stirrer F stored in the cartridge 50 to the discharge outlet 150 using magnetic force.

Figure 21A:
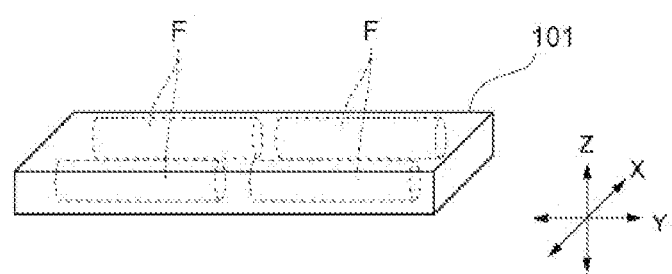
FIGS. 21A to 21C each are an descriptive diagram showing an example of the size of a discharge chamber of a cartridge.
Figure 21B:
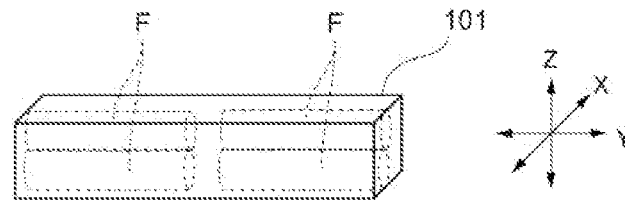
Figure 21C:
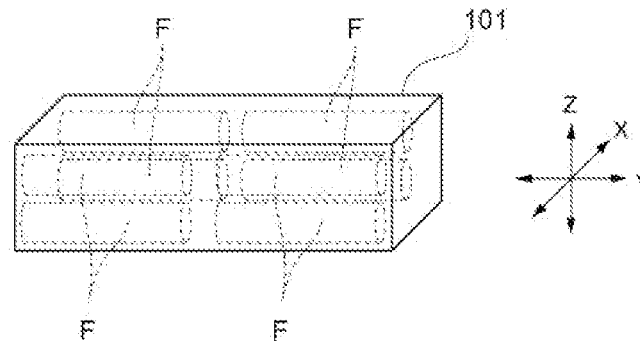

In the above embodiment, the discharge chamber 101 of the cartridge 50 has a size to accommodate one stirrer F, but may have a size to accommodate a plurality of stirrers F. As shown in FIG. 21A, the discharge chamber 101 may have a size that accommodates a total of four stirrers F arranged in two directions (X direction and Y direction) perpendicular to each other. As shown in FIG. 21B, the discharge chamber 101 may have a size that accommodates a total of four stirrers F arranged in two directions (Y direction and Z direction) perpendicular to each other. As shown in FIG. 21C, the discharge chamber 101 has a size that accommodates a total of eight stirrers F arranged two each in three mutually orthogonal directions (X direction, Y direction and Z direction).

In the above embodiments, the measurement aid was the stirrer put into the cuvette B for measuring the platelet aggregation ability, however, the stirrer also may be a metal ball that is put into a cuvette to measure the clotting time by a mechanical method. Here, the mechanical method is a method of measuring the coagulation time by capturing changes in viscosity of the blood sample by capturing changes in the amplitude of a metal ball put into a cuvette together with the blood sample. For example, in such a method, when a steel ball is used as the metal ball, an electromagnet is used to move the steel ball as a change in the amplitude of the steel ball put into the cuvette, and the change in the movement of the steel ball that changes with the coagulation reaction of the blood sample is measured. A change in the amplitude of the steel ball put into the cuvette may be obtained by stopping the steel ball using an electromagnet and capturing the change in the movement of the steel ball that starts moving due to the coagulation reaction of the blood sample. That is, the method of the above embodiment includes a loading step of loading a predetermined number of metal spheres out of the plurality of metal spheres contained in the cartridge 50 attached to the sample measuring device 1 into the container, a dispensing step of dispensing the sample into the container, and a measuring step of measuring the sample in the container into which the metal ball is loaded.

Although the sample measuring device 1 has the configuration shown in FIG. 13, the sample measuring device of the present invention is not limited to this configuration, and may have other configurations. The sample measuring device and sample measuring method of the present invention can be applied not only to measuring platelet aggregation ability, but also to other blood measurements such as blood immunoassays, and to measuring samples other than blood.

The present invention is useful in reducing the frequency with which a user loads a measurement aid into a sample measuring device.

For example, the present invention provides the following items (1) to (35).

1. A sample measuring method for measuring a sample using a container containing a measurement aid which is a solid, the sample measuring method comprising:
   loading a predetermined number of measurement aids into the container from a storage chamber in which a plurality of measurement aids are stored so as to be respectively movable, the storage chamber being disposed in a cartridge attached to a sample measuring device;
   dispensing the sample into the container; and
   measuring the sample in the container into which the measurement aid has been loaded.

2. The sample measuring method according to claim 1, wherein
   in the loading the predetermined number of measurement aids, the predetermined number of measurement aids are moved among the plurality of measurement aids stored in the storage chamber of the cartridge to a discharge outlet disposed in the cartridge, and are discharged therefrom.

3. The sample measuring method according to claim 2, wherein
   in the loading the predetermined number of measurement aids, the predetermined number of measurement aids are fallen from the discharge outlet and are discharged.

4. The sample measuring method according to claim 2, wherein
   in the loading the predetermined number of measurement aids, the predetermined number of measurement aids are moved to the discharge outlet by magnetic force.

5. The sample measuring method according to any one of claims 2 to 4, wherein
   in the loading the predetermined number of measurement aids, the predetermined number of measurement aids are loaded from the discharge outlet into a loading inlet of the sample measuring device by aligning a position of the discharge outlet and a position of the loading inlet by relatively moving the discharge outlet and the loading inlet.

6. The sample measuring method according to claim 5, wherein
   in the loading the predetermined number of measurement aids, the cartridge is rotated around a vertically central axis of the cartridge to align the position of the discharge outlet and the position of the loading inlet.

7. The sample measuring method according to any one of claims 1 to 6, wherein
   in the loading the predetermined number of measurement aids, the measurement aid discharged from the cartridge is loaded into the container through a passage disposed in the sample measuring device.

8. The method according to any one of claims 1 to 7, wherein
   in the loading the predetermined number of measurement aids, the measurement aid discharged from the cartridge is loaded into the container held by a container holding unit disposed in the sample measuring device.

9. The sample measuring method according to any one of claims 1 to 8, further comprising:
   detecting the measurement aid discharged from the cartridge, and
   determining whether the measurement aid has been loaded into the container based on the detection result of the detecting the measurement aid.

10. The sample measuring method according to any one of claims 1 to 9, wherein
    the measurement aid is a rod-shaped stirrer used in a platelet aggregation test.

11. The sample measuring method according to claim 10, wherein in the measuring the sample, the sample in the container is measured while the rod-shaped stirrer is stirred in the container.

12. The sample measuring method according to any one of claims 1 to 11, further comprising:

calculating a platelet aggregation rate based on absorbance or transmittance of the sample measured in the measuring the sample.

13. The sample measuring method according to any one of claims 1 to 12, further comprising:

detecting attachment of the cartridge to the sample measuring device.

14. The sample measuring method according to any one of claims 1 to 13, further comprising:

selecting a measurement order; and in the selecting the measurement order, the loading the predetermined number of measurement aids, the dispensing the sample, and the measuring the sample are performed when a measurement order for loading the measurement aid into the container is selected.

15. A cartridge to be attached to and detached from a sample measuring device for measuring a sample using a container containing a measurement aid which is a solid, the cartridge comprising:

a plurality of measuring aids which are respectively a solid;

a storage chamber in which the plurality of measurement aids are stored;

a discharge chamber communicating with the storage chamber and having a discharge outlet for discharging the measurement aid in the storage chamber; and an attaching/detaching part for attaching/detaching to/from the sample measuring device.

16. The cartridge of claim 15, wherein the discharge chamber has dimensions to store a predetermined number of measurement aids.

17. The cartridge according to claim 16, wherein the discharge chamber is positioned higher than the storage chamber when attached to the sample measuring device.

18. The cartridge according to claim 17, further comprising:

an inclined surface that gradually rises from a bottom surface of the storage chamber toward a bottom surface of the discharge chamber.

19. The cartridge according to claim 17 or 18, further comprising:

a movement restricting part disposed near an entrance of the discharge chamber, and protruding downward.

20. The cartridge according to any one of claims 15 to 19, wherein the storage unit has a plurality of storage areas separated from each other by partition plates; and the discharge outlet is provided in each of said plurality of storage areas.

21. The cartridge according to any one of claims 15 to 20, wherein the attaching/detaching part has an engagement part that engages with an engagement member provided in the sample measuring device.

22. The cartridge according to any one of claims 15 to 21, wherein the cartridge has a disk-like shape;

the attaching/detaching part is provided in the center of the disk shape;

the storage chamber is provided around the attaching/detaching part; and the discharge unit is provided on the outside the storage chamber.

23. The cartridge according to any one of claims 15 to 22, wherein the measurement aid is a rod-shaped stirrer used in a platelet aggregation test.

24. A sample measuring device for measuring a sample using a container containing a measurement aid which is a solid, the sample measuring device comprising:

a mounting unit to which a cartridge storing a plurality of measurement aids is detachably mounted;

a removing unit for removing the measuring aid from the cartridge mounted on the mounting part;

a transfer unit for transferring the measurement aid removed from the cartridge to the container;

a dispensing unit for dispensing the sample into the container; and a measuring unit for measuring the sample in the container to which the measurement aid has been transferred.

25. The sample measuring device according to claim 24, wherein the mounting unit is provided on the surface of the sample measuring device.

26. The sample measuring device according to claim 25, wherein the mounting unit has a recessed section in which the cartridge is accommodated.

27. The sample measuring device according to any one of claims 24 to 26, wherein the mounting unit has an engaging member with which the cartridge detachably engages.

28. The sample measuring device according to any one of claims 24 to 27, wherein the removing unit has a first mechanism for moving the measurement aid contained in the cartridge to a discharge outlet provided in the cartridge.

29. The sample measuring device according to claim 28, wherein the first mechanism has a magnetic force unit that moves the measurement aid stored in the cartridge by magnetic force.

30. The sample measuring device according to any one of claims 24 to 29, wherein the transfer unit has an introducing aperture into which the measurement aid removed from the cartridge is introduced; and the removing unit has a second mechanism for relatively moving the discharge outlet of the cartridge and the introducing inlet of the transfer unit to align the positions of the discharge outlet and the introducing aperture.

31. The sample measuring device according to claim 30, wherein the second mechanism has a rotation drive unit that rotates the cartridge around a central axis of the cartridge that extends in the vertical direction.

32. The sample measuring device according to any one of claims 24 to 31, wherein the transfer unit has a passage through which the measurement aid passes.

33. The sample measuring device according to any one of claims 24 to 32, wherein the transfer unit has a container holding unit that holds a container, and is configured to transfer the measurement aid to the container held by the container holding unit.

34. The sample measuring device according to any one of claims 24 to 33, further comprising:
a first detection unit that detects the presence or absence of the cartridge attached to the mounting unit.

35. The sample measuring device according to any one of claims 24 to 34, further comprising:
a second detection unit for detecting the measurement aid discharged from the cartridge.

EXPLANATION OF REFERENCE NUMBERS

1 Sample measuring device
50 Cartridge
51 Cartridge Mounting Mechanism
100 Storage chamber
101 Discharge chamber
102 Attaching/detaching part
150 Discharge outlet
200 Mounting unit
201 Removing unit
202 Transfer unit
B Cuvette
F Stirrer

What is claimed is:

1. A method of a platelet aggregation test for a blood sample using a container and a cylindrical-shaped stirrer made of a solid material, the method comprising:
loading the stirrer into the container from a cartridge provided with a storage chamber in which a plurality of the stirrers are movably stored, the cartridge being attached to a sample measuring device;
dispensing the blood sample into the container; and
measuring the blood sample in the container into which the stirrer has been loaded,
wherein in the measuring the blood sample, the blood sample in the container is measured while being stirred by the stirrer.

2. The method according to claim 1, wherein
in the loading, the stirrer is moved among the plurality of the stirrers stored in the storage chamber of the cartridge to a discharge outlet disposed in the cartridge, and is discharged therefrom.

3. The method according to claim 2, wherein
in the loading, the stirrer is fallen from the discharge outlet to be discharged.

4. The method according to claim 2, wherein
in the loading, the stirrer is moved to the discharge outlet by magnetic force.

5. The method according to claim 2, wherein
in the loading, the stirrer is loaded from the discharge outlet into a loading inlet of the sample measuring device by aligning a position of the discharge outlet and a position of the loading inlet by relatively moving the discharge outlet and the loading inlet.

6. The method according to claim 5, wherein
in the loading, the cartridge is rotated around a vertically central axis of the cartridge to align the position of the discharge outlet and the position of the loading inlet.

7. The method according to claim 1, wherein
in the loading, the stirrer discharged from the cartridge is loaded into the container through a passage disposed in the sample measuring device.

8. The method according to claim 1, wherein
in the loading, the stirrer discharged from the cartridge is loaded into the container held by a container holding unit disposed in the sample measuring device.

9. The method according to claim 1, wherein
in the measuring, the blood sample is irradiated while being stirred by the stirrer and an absorbance or a transmittance of the irradiated blood sample is measured, and
the method further comprises:
calculating a platelet aggregation rate based on the absorbance or the transmittance of the blood sample.

10. The method according to claim 1, further comprising:
detecting attachment of the cartridge to the sample measuring device.

11. The method according to claim 1, wherein the cartridge is rotatably attached to the sample measuring device, and wherein the storage chamber rotates at 50 rpm or more and 100 rpm or less.

12. A cartridge detachably installed to a sample measuring device operable to measure a blood sample using a container and a measurement aid made of a solid material, the cartridge comprising:
a plurality of the measurement aids;
a cartridge body provided with (i) a storage chamber in which the plurality of measurement aids is stored and (ii) a discharge chamber communicating with the storage chamber and having a discharge outlet shaped to allow the measurement aid to be discharged from the storage chamber; and
an attaching/detaching part configured to allow the cartridge body to be attached/detached to/from the sample measuring device,
wherein the discharge chamber has dimensions to store a predetermined number of measurement aids,
wherein the discharge chamber is positioned higher than the storage chamber when attached to the sample measuring device.

13. A sample measuring device operable to measure a blood sample using a container and a measurement aid made of a solid material, the sample measuring device comprising:
the cartridge according to claim 12;
a mounting unit to which the cartridge is detachably mounted;
a removing unit configured to remove the measurement aid from the cartridge mounted on the mounting unit;
a transfer unit configured to transfer the measurement aid removed from the cartridge to the container;
a dispensing unit configured to dispense the blood sample into the container; and
a measuring unit configured to measure the blood sample in the container to which the measurement aid has been transferred.

14. The cartridge according to claim 12, wherein the plurality of measurement aids are a plurality of stirrers.

15. The cartridge according to claim 14, wherein each stirrer and the discharge chamber are dimensioned such that the discharge chamber is capable of accommodating one and only one stirrer at a time.

16. The cartridge according to claim 14, wherein the discharge chamber has an elongated shape extending in a radially outward direction with respect to the storage chamber.

17. The cartridge according to claim 14, wherein the discharge chamber has a height dimension of from 1 to 2 mm, and a width dimension of from 1 to 2 mm.

18. The cartridge according to claim 17, wherein each of the height and width dimensions is less than twice a diameter of the stirrer.

19. A cartridge detachably installed to a sample measuring device operable to measure a blood sample using a container and a measurement aid made of a solid material, the cartridge comprising:

a plurality of the measurement aids;

a cartridge body provided with (i) a storage chamber in which the plurality of measurement aids is stored and (ii) a discharge chamber communicating with the storage chamber and having a discharge outlet shaped to allow the measurement aid to be discharged from the storage chamber; and an attaching/detaching part configured to allow the cartridge body to be attached/detached to/from the sample measuring device, wherein the cartridge body further comprises:

an inclined surface that gradually rises from a bottom surface of the storage chamber toward a bottom surface of the discharge chamber.

20. A device, comprising:

the cartridge according to claim 14;

a rotation drive shaft configured to receive the cartridge, wherein the cartridge is capable of being detachably mounted to the rotation drive shaft;

at least one magnet configured to exert a magnetic force on at least one stirrer to remove the at least one stirrer from the storage chamber;

a passage to allow the at least one stirrer removed from the cartridge to be transferred to a sample container; and a dispenser configured to dispense the blood sample into the sample container.

\* \* \* \* \*